United States Patent
Kang et al.

(10) Patent No.: US 11,290,160 B2
(45) Date of Patent: Mar. 29, 2022

(54) METHOD FOR TRANSMITTING FEEDBACK INFORMATION FOR THREE-DIMENSIONAL MIMO ON BASIS OF BEAMFORMED REFERENCE SIGNAL IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Hyungtae Kim, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 16/322,699

(22) PCT Filed: Jan. 3, 2017

(86) PCT No.: PCT/KR2017/000058
§ 371 (c)(1),
(2) Date: Mar. 5, 2020

(87) PCT Pub. No.: WO2018/026073
PCT Pub. Date: Feb. 8, 2018

(65) Prior Publication Data
US 2020/0204224 A1  Jun. 25, 2020

Related U.S. Application Data

(60) Provisional application No. 62/369,756, filed on Aug. 2, 2016.

(51) Int. Cl.
*H04W 72/04*  (2009.01)
*H04B 7/0456*  (2017.01)
(Continued)

(52) U.S. Cl.
CPC ......... *H04B 7/0456* (2013.01); *H04B 7/0626* (2013.01); *H04L 5/0048* (2013.01); *H04W 72/042* (2013.01)

(58) Field of Classification Search
CPC .. H04B 7/0626; H04B 7/0695; H04B 7/0617; H04B 7/0639; H04B 7/0456;
(Continued)

(56) References Cited

U.S. PATENT DOCUMENTS

2013/0242773 A1* 9/2013 Wernersson ........... H04B 7/024
370/252
2014/0098689 A1  4/2014 Lee et al.
(Continued)

FOREIGN PATENT DOCUMENTS

| KR | 10-2014-0057005 A | 5/2014 |
| WO | 2015-180178 A1 | 12/2015 |
| WO | 2016-018100 A1 | 2/2016 |

*Primary Examiner* — Eva Y Puente
(74) *Attorney, Agent, or Firm* — Dentons US LLP

(57) ABSTRACT

The present disclosure provides a method for transmitting, by a user equipment, feedback information to a base station in a wireless communication system. The method includes receiving, from the base station, information about reference signal port group sets composed of one or more reference signal port groups; selecting at least one reference signal port group set among the reference signal port group sets; under assuming that a specific precoder has applied to the selected at least one reference signal port group set, calculating channel state information (CSI) corresponding to the selected at least one reference signal port group set; and transmitting, to the base station, the feedback information including an indicator indicating the selected at least one reference signal port group set and the channel state information; wherein the one or more reference signal port groups are composed of reference signal ports to which the same precoder is applied.

8 Claims, 18 Drawing Sheets

(51) Int. Cl.
*H04B 7/06* (2006.01)
*H04L 5/00* (2006.01)

(58) Field of Classification Search
CPC ...... H04B 7/0417; H04B 7/06; H04B 7/0632;
H04B 7/0478; H04B 7/0486; H04B
7/063; H04B 7/0404; H04B 7/0408;
H04W 72/042; H04W 76/27; H04W
72/046; H04W 16/28; H04W 72/0446;
H04W 92/18; H04W 24/10; H04W
72/0413; H04W 74/0833; H04W 76/14;
H04W 24/08; H04W 72/0406; H04W
72/085; H04L 5/0048; H04L 5/0051;
H04L 5/0053; H04L 5/0023; H04L 5/001;
H04L 5/0055; H04L 5/005; H04L 1/1819;
H04L 5/0007; H04L 5/0044; H04L
5/0094; H04L 5/0098; H04L 1/1812
USPC ........................................................ 370/329
See application file for complete search history.

(56) References Cited

U.S. PATENT DOCUMENTS

| | | |
|---|---|---|
| 2015/0003271 A1 | 1/2015 | Park et al. |
| 2016/0285660 A1* | 9/2016 | Frenne ................. H04B 7/0626 |
| 2018/0159601 A1* | 6/2018 | Moosavi .............. H04W 88/08 |
| 2018/0309526 A1* | 10/2018 | Zhang ................. H04B 7/0617 |

* cited by examiner

FIG. 2
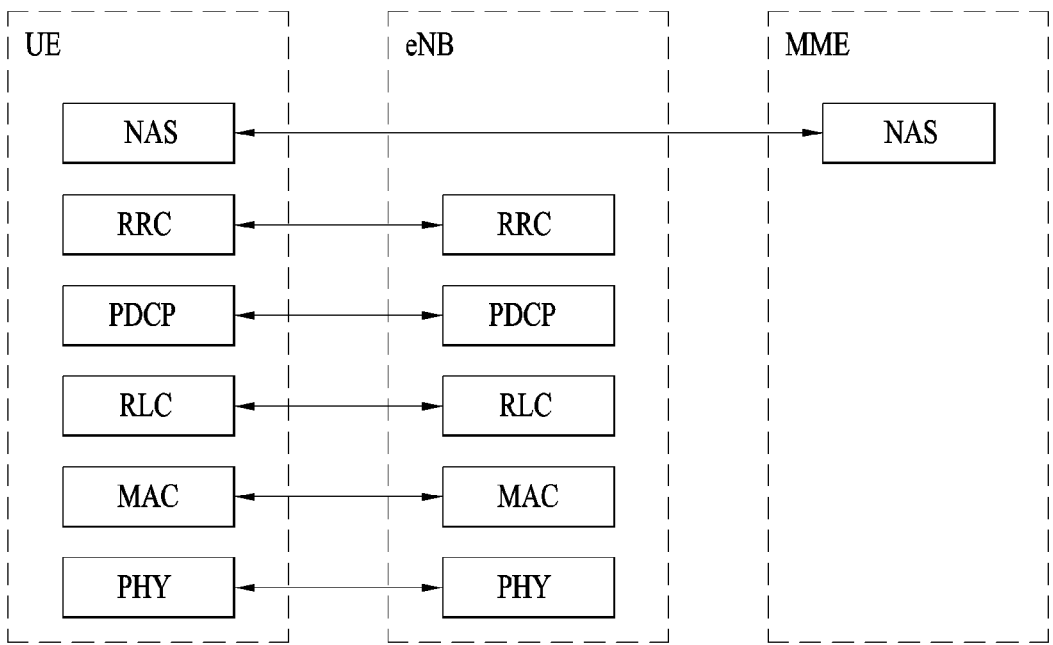
(A) CONTROL-PLANE PROTOCOL STACK
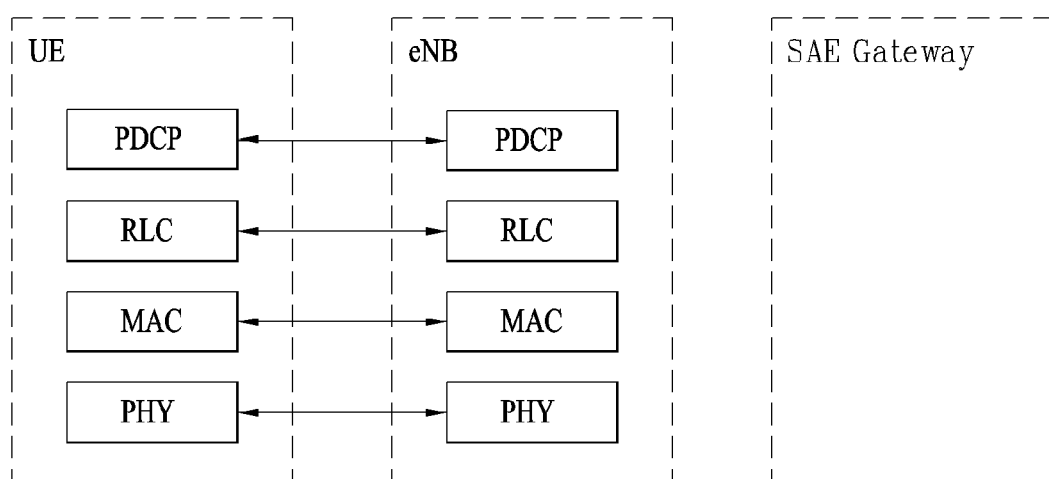
(B) USER-PLANE PROTOCOL STACK

▨ : DMRS GROUP 1

▩ : DMRS GROUP 2

FIG. 11
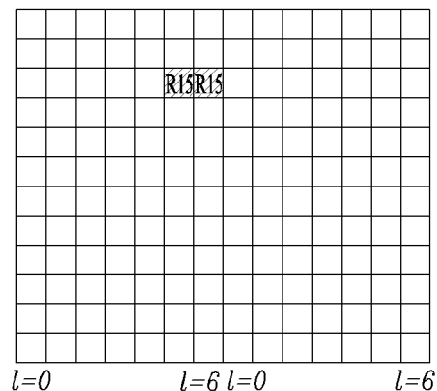
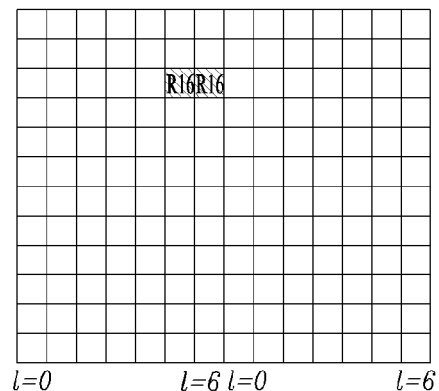
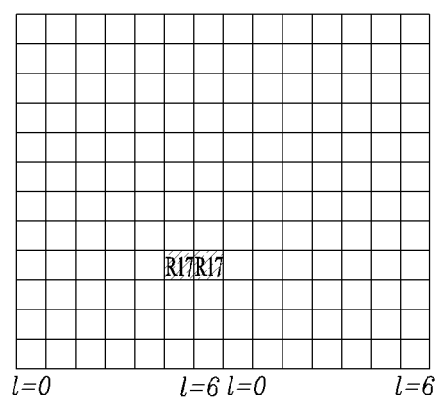
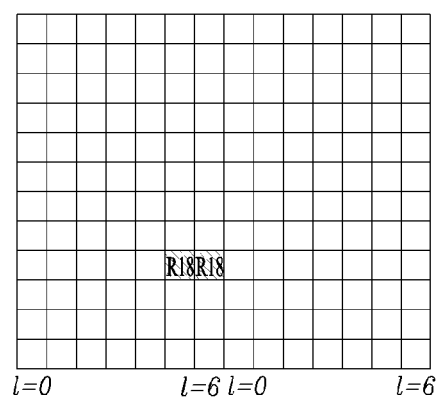
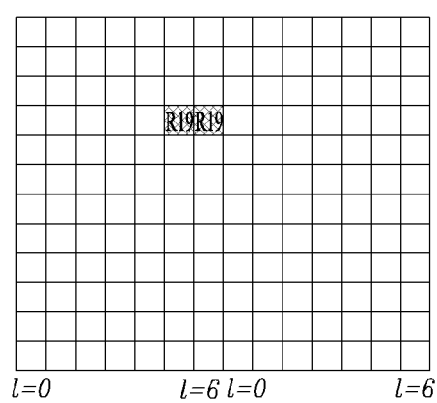
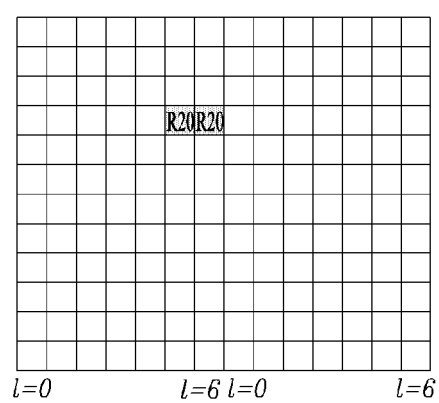
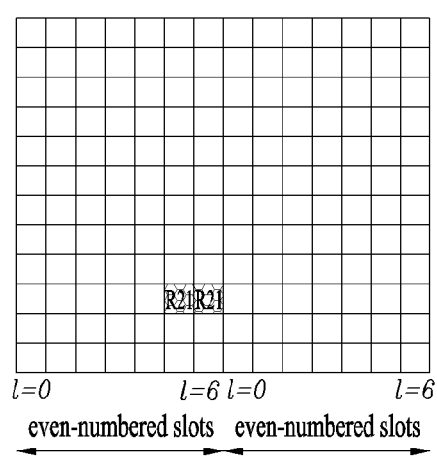
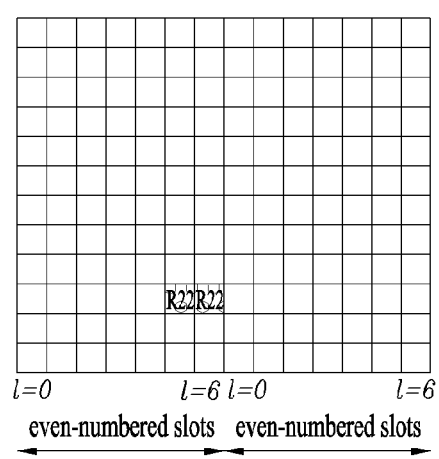

(a) CONVENTIONAL ANTENNA SYSTEM       (b) AAS

METHOD FOR TRANSMITTING FEEDBACK INFORMATION FOR THREE-DIMENSIONAL MIMO ON BASIS OF BEAMFORMED REFERENCE SIGNAL IN WIRELESS COMMUNICATION SYSTEM, AND APPARATUS THEREFOR

This application is the National Phase of PCT International Application No. PCT/KR2017/000058, filed on Jan. 3, 2017, which claims the benefit of U.S. Provisional Application No. 62/369,756, filed on Aug. 2, 2016, which are all hereby incorporated by reference herein in their entirety.

TECHNICAL FIELD

The present disclosure relates to a wireless communication system, and, more particularly, to a method for transmitting feedback information for 3D multi-input multi-output (MIMO) based on a beamformed reference signal in a wireless communication system and to a device for performing the method.

BACKGROUND

As an example of a mobile communication system to which the present disclosure is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Purpose

A technical purpose of the present disclosure is to provide a method for transmitting feedback information for 3D multi-input multi-output (MIMO) based on a beamformed reference signal in a wireless communication system and to provide a device for performing the method.

Technical Solution

In one aspect, there is provided a method for transmitting, by a user equipment, feedback information to a base station in a wireless communication system, the method comprising: receiving, from the base station, information about reference signal port group sets composed of one or more reference signal port groups; selecting at least one reference signal port group set among the reference signal port group sets; under assuming that a specific precoder has applied to the selected at least one reference signal port group set, calculating channel state information (CSI) corresponding to the selected at least one reference signal port group set; and transmitting, to the base station, the feedback information including an indicator indicating the selected at least one reference signal port group set and the channel state information; wherein the one or more reference signal port groups are composed of reference signal ports to which the same precoder is applied.

In another aspect, there is provided an user equipment (UE) in a wireless communication system, the UE comprising: a wireless communication module; and a processor coupled to the module, wherein the processor is configured for: receiving, from the base station, information about reference signal port group sets composed of one or more reference signal port groups; selecting at least one reference signal port group set among the reference signal port group sets; under assuming that a specific precoder has applied to the selected at least one reference signal port group set, calculating channel state information (CSI) corresponding to the selected at least one reference signal port group set; and transmitting, to the base station, the feedback information including an indicator indicating the selected at least one reference signal port group set and the channel state information; wherein the one or more reference signal port groups are composed of reference signal ports to which the same precoder is applied.

In one embodiment, the method further comprises or the processor is further configured for: receiving information about the specific precoder from the base station.

In one embodiment, calculating the channel state information includes or the processor is further configured for: calculating the channel state information, under assuming that the specific precoder has applied to the reference signal ports included in one or more reference signal port groups constituting the selected at least one reference signal port group set.

In one embodiment, the method further comprises or the processor is further configured for: receiving information on the reference signal port groups via a higher layer signal, wherein the information about the reference signal port group sets is received via a physical layer signal.

In one embodiment, the method further comprises or the processor is further configured for: receiving a downlink control signal transmitted based on the feedback information from the base station.

In one embodiment, the method further comprises or the processor is further configured for: receiving, from the base station, information regarding a reference signal port group set for downlink signal transmission determined based on the feedback information.

Technical Effect

An embodiment of the present disclosure can efficiently calculate and report feedback information for three-dimensional MIMO based on a beamformed reference signal in a wireless communication system.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF DRAWINGS

FIG. 2 is a diagram illustrating structures of a control plane and a user plane of a radio interface protocol between a UE and an E-UTRAN based on the 3GPP radio access network specification.

FIG. 11 illustrates CSI-RS configuration #0 of DL CSI-RS configurations defined in the current 3GPP standard.

DETAILED DESCRIPTIONS

Figure 1:
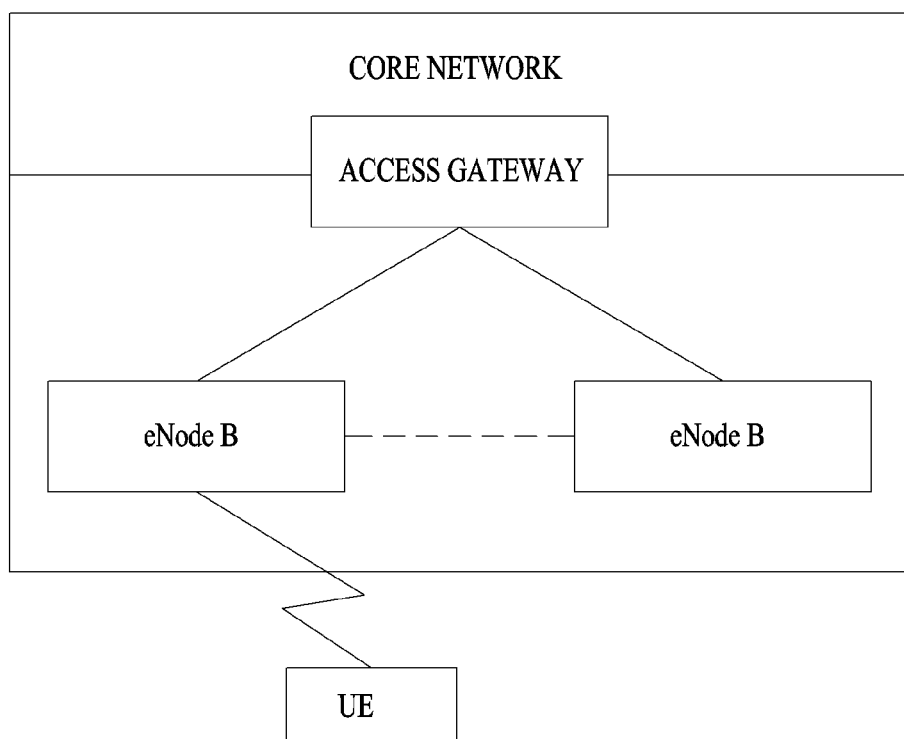
FIG. 1 is a diagram schematically illustrating a network structure of an E-UMTS as an exemplary radio communication system.

Hereinafter, structures, operations, and other features of the present disclosure will be readily understood from the embodiments of the present disclosure, examples of which are illustrated in the accompanying drawings. Embodiments which will be described hereinbelow are examples in which technical features of the present disclosure are applied to a 3GPP system.

Although the embodiments of the present disclosure will be described based on an LTE system and an LTE-advanced (LTE-A) system, the LTE system and the LTE-A system are purely exemplary and the embodiments of the present disclosure can be applied to any communication system corresponding to the aforementioned definition. In addition, although the embodiments of the present disclosure will be described based on frequency division duplexing (FDD), the FDD mode is purely exemplary and the embodiments of the present disclosure can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
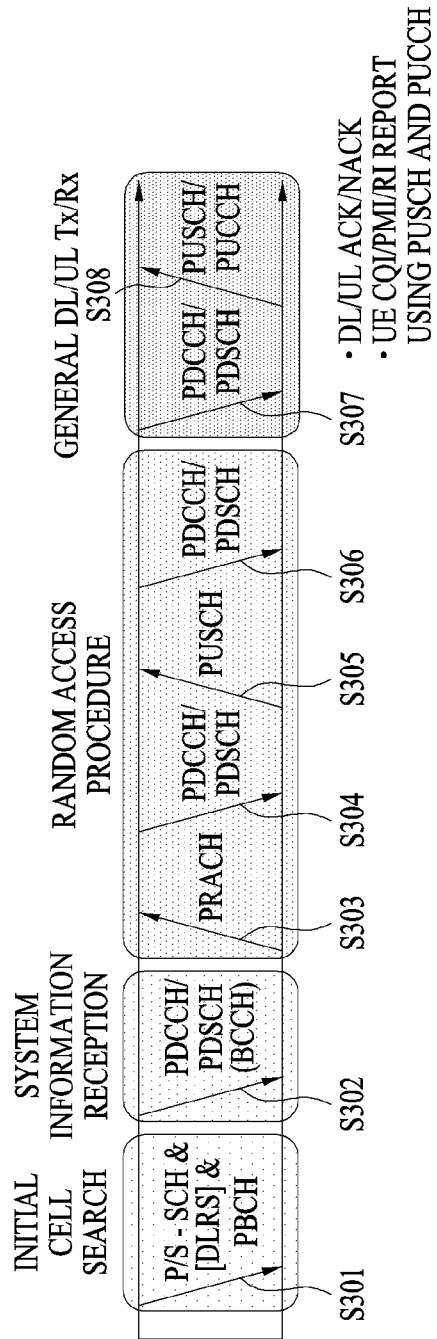
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
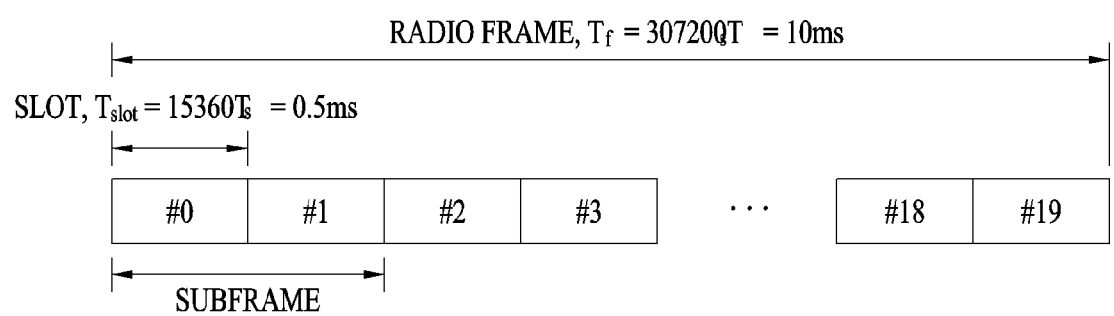
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
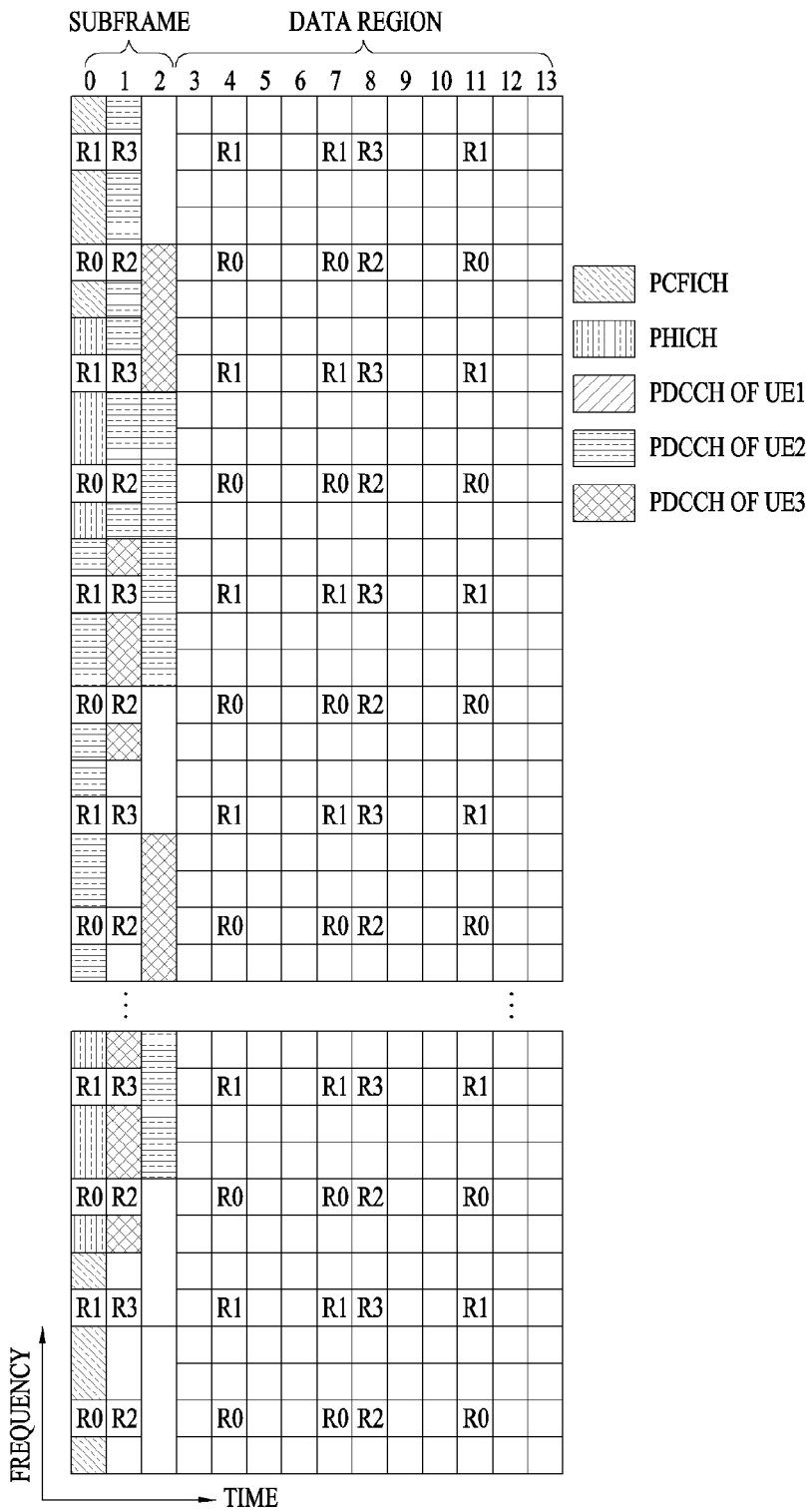
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIGS. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
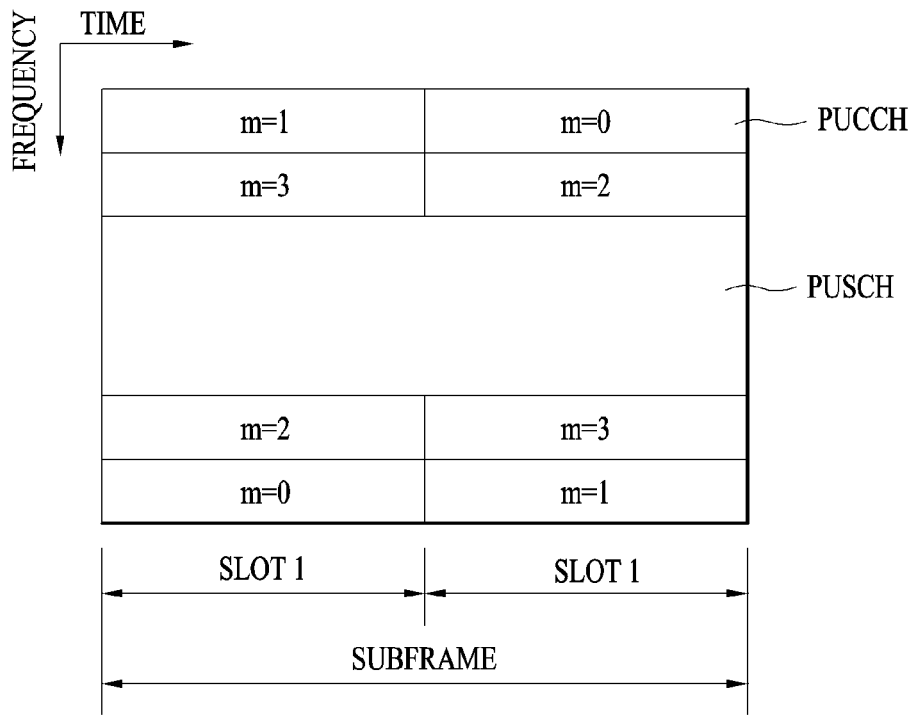
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
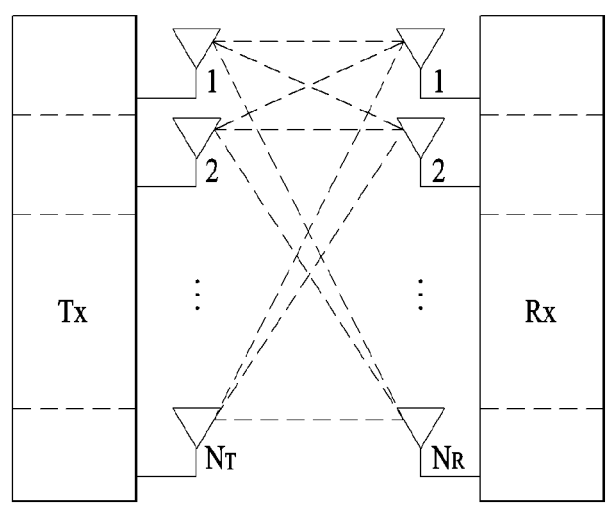
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots s_{N_T}]^T \quad \text{[Equation 2]}$$

Individual pieces of the transmission information $s_1, s_2, \ldots s_{N_T}$ may have different transmit powers. If the individual transmit powers are denoted by $P_1, P_2, \ldots P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector ŝ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad [\text{Equation 8}]$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \quad [\text{Equation 9}]$$

where $X_i$ is Nt/2 by M matrix.

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\,columns} \text{ (if rank = r),}$$

where $1 \le k, l, m \le M$ and k, l, m are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad [\text{Equation 10}]$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$s expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
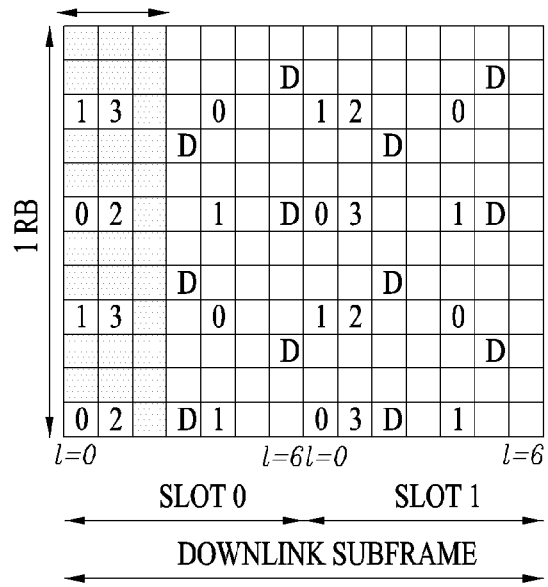
FIGS. 8 and 9 are diagrams illustrating DL RS configurations in an LTE system supporting DL transmission through four antennas.
Figure 9:
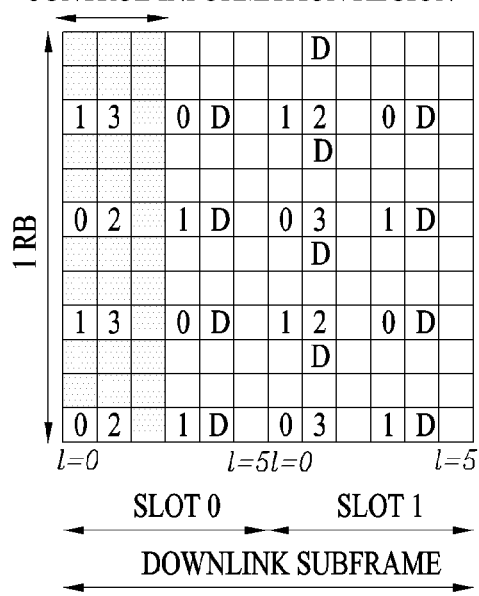

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
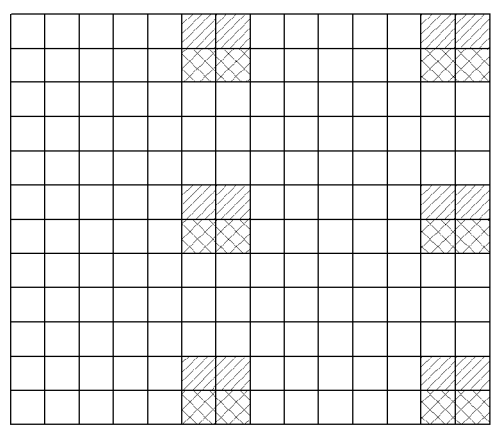
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 1 and Table 2 list CSI-RS configurations defined in the 3GPP standard. Specifically, Table 1 lists CSI-RS configurations in the case of a normal CP and Table 2 lists CSI-RS configurations in the case of an extended CP.

TABLE 1

| CSI reference signal configuration | | 1 or 2 | | 4 | | 8 | |
|---|---|---|---|---|---|---|---|
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI reference signal configuration | | 1 or 2 | | 4 | | 8 | |
|---|---|---|---|---|---|---|---|
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |

TABLE 2-continued

| CSI reference signal configuration | | 1 or 2 | | 4 | | 8 | |
|---|---|---|---|---|---|---|---|
| | | (k', l') | $n_s$ mod 2 | (k', l') | $n_s$ mod 2 | (k', l') | $n_s$ mod 2 |
| | 26 | (1, 1) | 1 | | | | |
| | 27 | (0, 1) | 1 | | | | |

In Table 1 and Table 2, (k',l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$ and a subframe offset $\Delta_{CSI-RS}$. Table 3 lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, information about a zero power (ZP) CSI-RS is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CS-RS transmission periodicity and subframe offset of a ZP CSI-RS by $I_{CSI-RS}$ illustrated in Table 3. zeroTxPowerResourceConfigList indicates a ZP CSI-RS configuration. The elements of this bitmap indicate the respective configurations included in the columns for four CSI-RS antenna ports in Table 1 or Table 2. A normal CSI-RS other than ZP CSI-RS is referred to as non zero-power (NZP) CSI-RS. When the above-described CoMP scheme is applied, a plurality of CSI-RS configurations may be signaled to the UE through an RRC layer signal. The CSI-RS configurations are defined as listed in Table 4. Referring to Table 4, it may be appreciated that information about CRS capable of assuming quasi co-location (QCL) is included in each CSI-RS configuration.

TABLE 4

```
ASN1START
CSI-RS-Config-r10 ::=      SEQUENCE {
  csi-RS-r10               CHOICE {
    ...
  }
  zeroTxPowerCSI-RS-r10    CHOICE {
    release                  NULL,
    setup                    SEQUENCE {
      zeroTxPowerResourceConfigList-r10    BIT STRING (SIZE (16)),
      zeroTxPowerSubframeConfig-r10        INTEGER (0..154)
    }
  }
}
```

For reference, according to the current 3GPP standard document, the CQI index, the corresponding modulation order, and the coding rate are shown in Table 5 below.

TABLE 5

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In one example, the operation for calculating the CQI using the interference measurement is as follows.

The user equipment needs to calculate the SINR as a factor necessary for calculating the CQI. In this case, the UE may perform the reception power measurement (S-measure) of the desired signal using the RS such as NZP CSI-RS. For an interference power measurement (I-measure or Interference measurement), the UE measures the power of an interfering signal resulting from removal of the desired signal from the received signal.

The subframe sets $C_{CSL0}$ and $C_{CSL1}$ for CSI measurement may be configured via a higher layer signaling. The subframes corresponding to each of the subframe sets may not overlap with each other, but may be included in only one set. In such a case, the UE may perform the S-measure using RS such as CSI-RS without special subframe restrictions. However, in the case of I-measure, the UE individually performs the I-measure for each of subframe sets $C_{CSL0}$ and $C_{CSL1}$. Thus, the UE has to perform two different CQI calculations for the subframe sets $C_{CSL0}$ and $C_{CSL1}$.

Now a description will be given of QCL between antenna ports.

If one antenna port is quasi co-located with another antenna port, this means that a UE may assume that the large-scale properties of a signal received from one antenna port (or a radio channel corresponding to the antenna port) are wholly or partially identical to those of a signal received from another antenna port (or a radio channel corresponding to the antenna port). The large-scale properties may include Doppler spread and Doppler shift which are associated with a frequency offset, average delay and delay spread which are associated with a timing offset, and average gain.

According to the definition of QCL, the UE may not assume that antenna ports that are not quasi co-located with each other have the same large-scale properties. Therefore, the UE should independently perform a tracking procedure in order to obtain the frequency offset and timing offset of each antenna port.

Meanwhile, the UE may perform the following operations regarding quasi co-located antenna ports.

1) The UE may identically apply estimated results of a power-delay profile of a radio channel corresponding to a specific antenna port, delay spread, Doppler spectrum, and Doppler spread to Wiener filter parameters used in channel estimation of a radio channel corresponding another antenna port.

2) The UE may acquire time synchronization and frequency synchronization of the specific antenna port and apply the same synchronization to another antenna port.

3) Finally, the UE may calculate the average of reference signal received power (RSRP) measurements of the quasi co-located antenna ports as an average gain.

For example, it is assumed that upon receipt of scheduling information of a DM-RS based DL data channel, e.g. DCI format 2C, through a PDCCH (or an enhanced PDCCH (E-PDCCH)), the UE performs channel estimation on a PDSCH using a DM-RS sequence indicated by the scheduling information and then demodulates data.

In this case, if a DM-RS antenna port for DL data channel demodulation is quasi co-located with a CRS antenna port of a serving cell, the UE may apply large-scale properties of a radio channel, which have been estimated from the CRS antenna port thereof, to channel estimation through the DM-RS antenna port, thereby improving the reception performance of the DM-RS based DL data channel.

Similarly, if the DM-RS antenna port for DL data channel demodulation is quasi co-located with the CSI-RS antenna port of the serving cell, the UE may apply large-scale properties of a radio channel, which have been estimated from the CSI-RS antenna port of the serving cell, to channel estimation through the DM-RS antenna port, thereby improving the reception performance of the DM-RS based DL data channel.

Meanwhile, in LTE, it is regulated that when a DL signal is transmitted in mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with large-scale properties except average gain. This means that physical channels and signals are transmitted in the same point. On the other hand, QCL type B is defined such that up to four QCL modes are configured for each UE by a higher-layer message to enable CoMP transmission such as DPS or JT and which QCL mode is used to receive a DL signal is dynamically configured through DCI.

DPS transmission in the case of QCL type B will now be described in more detail.

It is assumed that node #1 having $N_1$ antenna ports transmits CSI-RS resource #1 and node #2 having $N_2$ antenna ports transmits CSI-RS resource #2. In this case, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within a common overage of node #1 and node #2 by a higher-layer signal.

Then, the eNB may perform DPS by configuring, using DCI, QCL mode parameter set #1 for the UE during data (i.e. a PDSCH) transmission to the UE through node #1 and configuring QCL mode parameter set #2 for the UE during data transmission to the UE through node #2. If QCL mode parameter set #1 is configured for the UE through the DCI, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An active antenna system (AAS) and three-dimensional beamforming will be described below.

In a legacy cellular system, an eNB reduces ICI and increases the throughput of UEs within a cell, e.g. SINRs, by mechanical tilting or electrical tilting, which will be described below in more detail.

Figure 12:
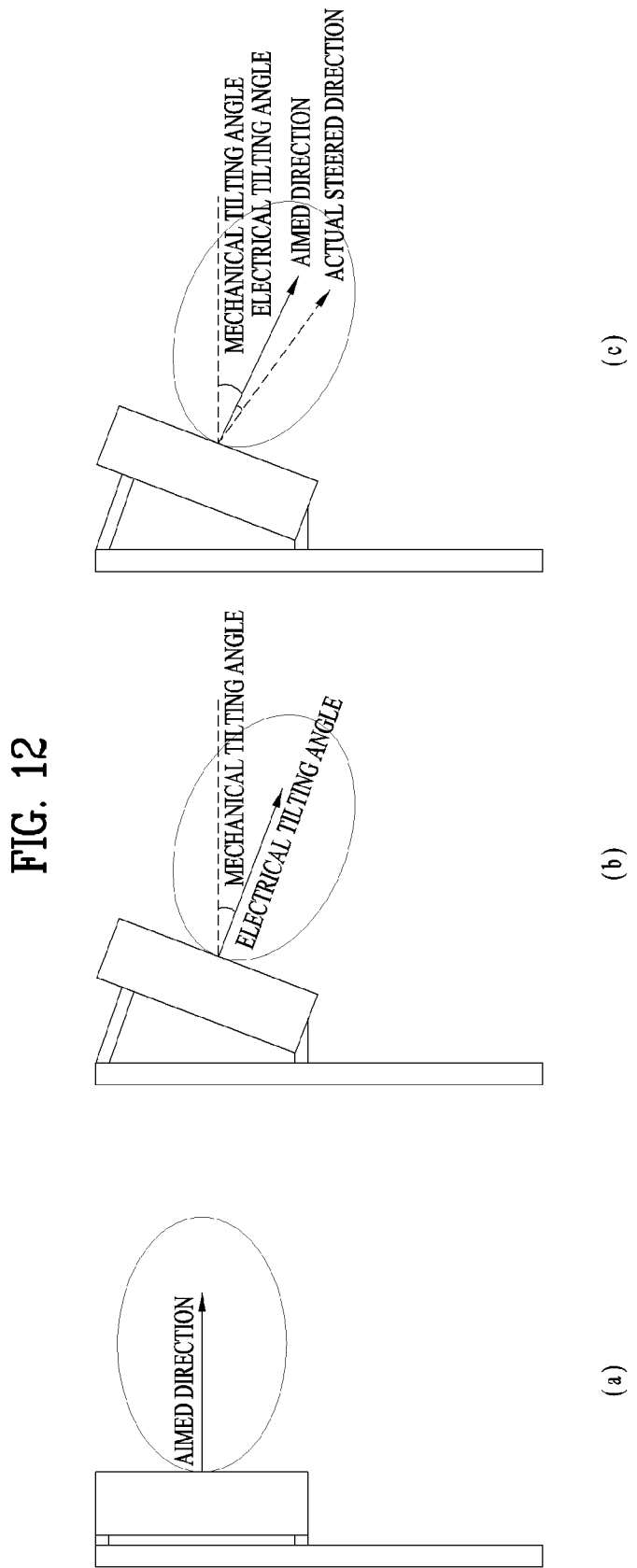
FIG. 12 is a diagram illustrating an antenna tilting scheme.

FIG. 12 is a diagram illustrating an antenna tilting scheme. Specifically, FIG. 12(a) illustrates an antenna structure to which antenna tilting is not applied, FIG. 12(b) illustrates an antenna structure to which mechanical tilting is applied, and FIG. 12(c) illustrates an antenna structure to which both mechanical tilting and electrical titling are applied.

In comparison with FIG. 12(a), mechanical tilting of FIG. 12(b) causes a beam direction to be fixed at initial antenna installation. Electrical tilting of FIG. 12(c) allows only very restrictive vertical beamforming due to cell-fixed tilting, despite the advantage of changing a tilting angle through an internal phase shift module.

Figure 13:
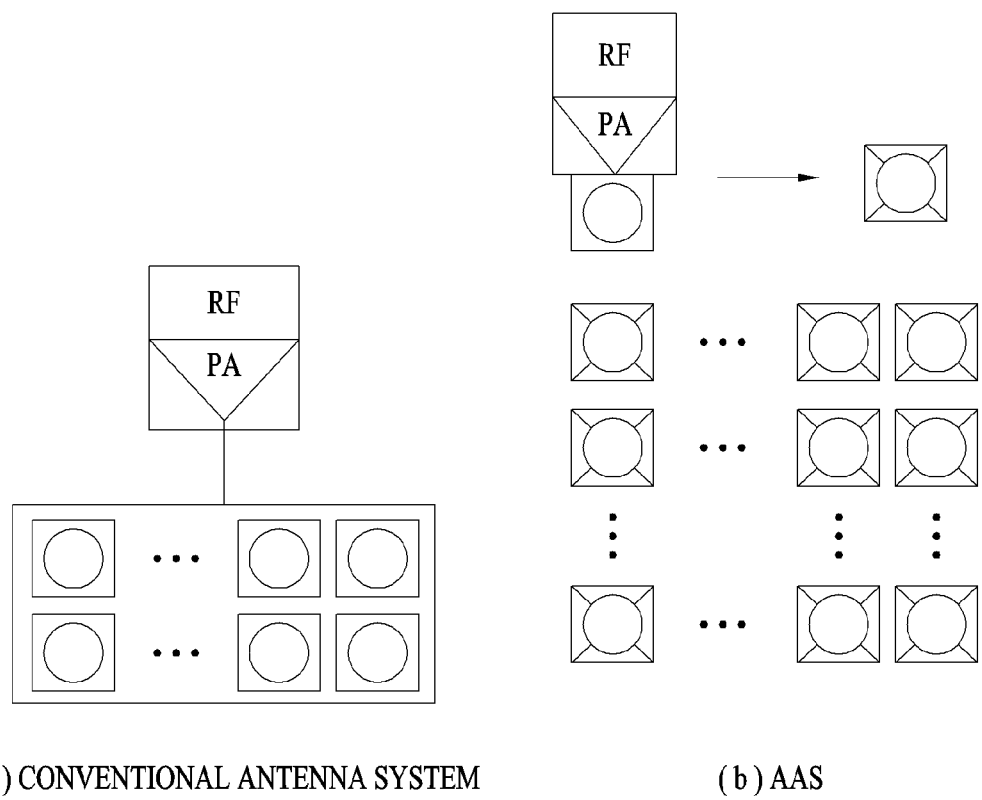
FIG. 13 is a diagram comparing a conventional antenna system with an active antenna system (AAS).

FIG. 13 is a diagram comparing a conventional antenna system with an AAS. Specifically, FIG. 13(a) illustrates the antenna system of the related art and FIG. 13(b) illustrates the AAS.

Referring to FIG. 13, as compared to the conventional antenna system, the AAS includes a plurality of antenna modules, each of which includes a radio frequency (RF) module such as a power amplifier (PA), that is, an active device so that the AAS can control the power and phase of each antenna module.

Generally, a linear array antenna, i.e. a one-dimensional array antenna, such as a ULA has been considered as a MIMO antenna structure. In a one-dimensional array structure, a beam that may be formed by beamforming exists on a two-dimensional (2D) plane. The same applies to a passive antenna system (PAS) based MIMO structure of a legacy eNB. Although a PAS based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved into an AAS, RF modules are independently configured even in vertical antennas. Consequently, vertical beamforming as well as horizontal beamforming is possible. This is called vertical beamforming or elevation beamforming.

The vertical beamforming may also be referred to as three-dimensional (3D) beamforming in that beams that can be generated according to the vertical beamforming may be formed in a 3D space in the vertical and horizontal directions. That is, the evolution of a one-dimensional array antenna structure to a 2D array antenna structure enables 3D beamforming. 3D beamforming is not necessarily formed when an antenna array is planar. Rather, 3D beamforming may be formed even in a ring-shaped 3D array structure. A feature of 3D beamforming lies in that a MIMO process is implemented on a 3D space in view of various antenna layouts other than existing one-dimensional antenna structures.

Figure 14:
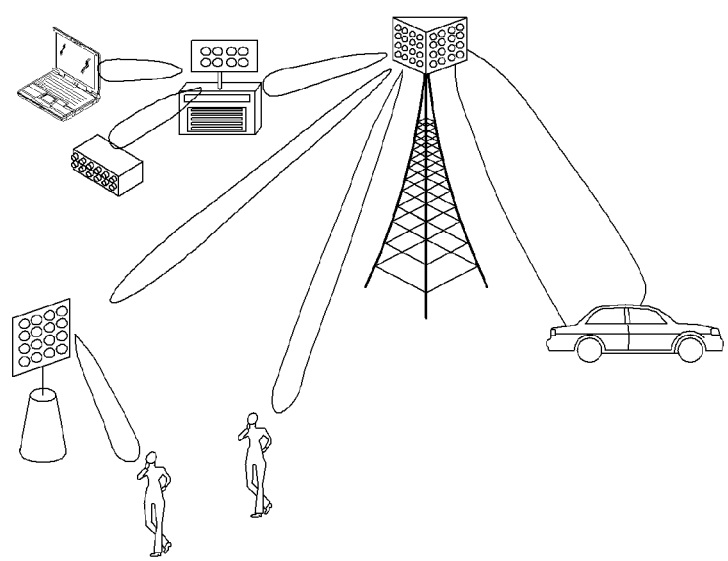
FIG. 14 illustrates exemplary UE-specific beamforming based on an AAS.

FIG. 14 illustrates exemplary UE-specific beamforming based on an AAS. Referring to FIG. 14, even though a UE moves forward or backward from an eNB as well as to the left and right of the eNB, a beam may be formed toward the UE by 3D beamforming. Therefore, a higher degree of freedom is given to UE-specific beamforming.

Further, as transmission environments using an AAS based 2D array antenna structure, not only an outdoor-to-outdoor environment where an outdoor eNB transmits a signal to an outdoor UE but also an outdoor-to-indoor (O2I) environment where an outdoor eNB transmits a signal to an indoor UE and an indoor hotspot where an indoor eNB transmits a signal to an indoor UE may be considered.

Figure 15:
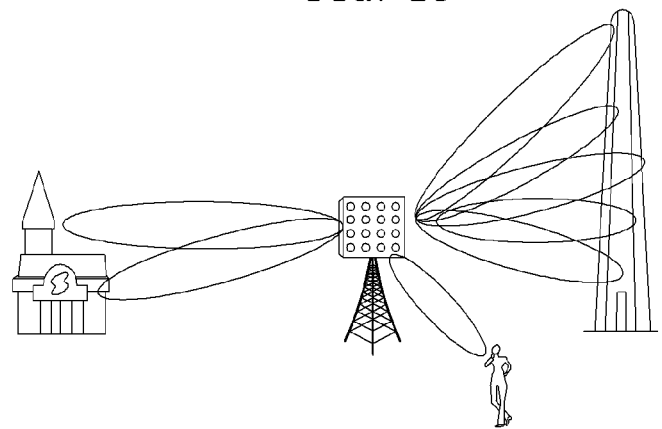
FIG. 15 illustrates an AAS based 3D beam transmission scenario.

FIG. 15 illustrates an AAS based 3D beam transmission scenario.

Referring to FIG. 15, an eNB needs to consider vertical beam steering based on various UE heights in relation to building heights as well as UE-specific horizontal beam steering in a real cell environment in which a plurality of buildings is present in a cell. Considering this cell environment, significantly different channel characteristics from those of an existing wireless channel environment, for example, shadowing/pathloss changes according to different heights, fading characteristic variations, etc. need to be reflected.

In other words, 3D beamforming is an evolution of beamforming in the horizontal direction only, based on an existing linear one-dimensional antenna array structure. 3D beamforming refers to a MIMO processing scheme performed by extending horizontal beamforming to elevation beamforming or vertical beamforming or combining horizontal beamforming with elevation beamforming or vertical beamforming, based on a multi-dimensional array antenna structure such as a planar array or on a massive antenna array.

Hereinafter, a MIMO system using linear precoding will be described. The downlink MIMO system may be modeled as shown in following Equation (11) in a frequency unit (for example, a subcarrier unit), which may be assumed to experience flat fading in terms of the frequency in a narrow band system or a wideband system.

$$y = Hx + z \qquad \text{[Equation 11]}$$

Assuming that $N_r$ refers to the number of Rx antenna ports of the UE, and $N_t$ refers to the number of Tx antenna ports of the BS, y refers to $N_r \times 1$ signal vectors received at the $N_r$ Rx antennas of the UE, H refers to a MIMO channel matrix of size $N_r \times N_t$, x refers to $N_t \times 1$ transmission signals, and z refers to $N_r \times 1$ received noise and interference vectors.

The above system model is applicable to a multi-user MIMO scenario as well as a single-user MIMO scenario. In the latter case, the $N_r$ refers to the number of Rx antenna ports of the single UE, and in the former case, the $N_r$ refers to the total number of Rx antenna ports of the multiple UEs.

The above system model is applicable to a UL transmission scenario as well as a DL transmission scenario. In this connection, $N_t$ may represent the number of Tx antennas at the UE and $N_r$ may represent the number of Rx antennas at the BS.

In the case of a linear MIMO precoder, the MIMO precoder may be generally represented as a matrix U of size $N_t \times N_s$ where $N_s$ refers to the transmission ranks or the number of transmission layers. Accordingly, the transmission signal vector X may be modeled as an equation 12 as follows.

$$x = \sqrt{\frac{P_T}{N_s}} Us \qquad \text{[Equation 12]}$$

where, $P_T$ refers to transmission signal energy, s refers to $N_s \times 1$ transmission signal vectors representing signals transmitted in $N_s$ transmission layers. That is, $E\{s^H U^H Us\} = Ns$. When $N_t \times 1$ precoding vectors corresponding to $N_s$ the transmission layers be denoted by $u_1, \ldots, u_{N_s}$, $U = [u_1 \ldots u_{N_s}]$. In this case, Equation 12 may be expressed as Equation 13 below.

$$x = \sqrt{\frac{P_T}{N_s}} \sum_{i=1}^{N_s} u_i s_i \qquad \text{[Equation 13]}$$

where, $s_i$ refers to an i-th element of the vector s. Generally, it may be assumed that signals transmitted in different layers are uncorrelated ($E\{s_j^* s_i\}=0 \forall i \neq j$), and the average magnitudes of the signals may be the same. When it is assumed that the average energy of each signal is 1 ($E\{|s_i|^2\}=1 \forall i$), the sum of the energy of the layer precoding vectors may be equal to $N_s$ as follows:

$$\sum_{i=1}^{N_s} E\{u_i^H u_i\} = N_s \quad \text{[Equation 14]}$$

When a signal is to be transmitted with the same power in each layer, it is noted from the above equation that $E\{u_i^H u_i\}=1$.

Meanwhile, as a future multi-antenna system such as massive MIMO or large-scale MIMO evolves, the number of antennas will increase gradually. In fact, use of up to 64 Tx antennas is considered for the base station in the LTE standard, taking into account a 3D MIMO environment.

However, as the number of antennas increases, pilot overhead and feedback overhead also increase. As a result, decoding complexity may be increased. Since the size of the MIMO channel matrix H increases in proportion to the increase in the number of antennas at the base station (BS), the base station should transmit more measurement pilots to a UE so that the UE may estimate the MIMO channels. If the UE feeds back explicit or implicit information about the measured MIMO channels to the base station, the amount of feedback information will increase as the channel matrix gets larger. Particularly, when a codebook-based PMI feedback is transmitted as in the LTE system, the increase of antennas in number leads to an exponential increase in the size of a PMI codebook. Consequently, the computation complexity of the BS and the UE is increased.

In this environment, system complexity and overhead may be mitigated by partitioning total Tx antennas and thus transmitting a pilot signal or a feedback on a sub-array basis. Especially, from the perspective of the LTE standard, a large-scale or massive MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an i-th layer are denoted by $u_{i,1}, \ldots, u_{i,M}$, the precoding vector for the i-th layer may be represented as follows: $u_i = [u_{i,1}^T\, u_{i,2}^T\, \ldots\, u_{i,M}^T]^T$, where, each sub-precoding vector experiences, as an effective channel, a sub-channel matrix obtained by dividing the Nr×Nt sized MIMO channel matrix H by the number of transmit antennas of each partition in a row direction. In this connection, the MIMO channel matrix H expressed by the sub-channel matrixes may be expressed as follows:

$$H=[H_1 \ldots H_M] \quad \text{[Equation 15]}$$

When the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an m-th partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, the partitioned precoding is modeled as follows, in consideration of codebook-based precoding:

$$u_i = [\alpha_{i,1} v_{i,1}^T\, \alpha_{i,2} v_{i,2}^T\, \ldots\, \alpha_{i,M} v_{i,M}^T]^T \quad \text{[Equation 16]}$$

As noted from the above equation 16, the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining normalized precoding schemes for the partitions of antennas (antenna ports) and linking coefficients that link the normalized precoding schemes to one another.

M linking coefficients for the i-th layer may be defined in the form of a vector as follows: $a_i = [\alpha_{i,1}\, \alpha_{i,2}\, \ldots\, \alpha_{i,M}]^T$. Hereinafter, $a_i$ may be referred to as a "linking vector".

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as in a following equation 17. This is because it is assumed in many cases that the first element is already normalized from the perspective of the whole precoding vector $u_i$:

$$\frac{a_i}{\alpha_{i,1}} = \left[1\, \frac{\alpha_{i,2}}{\alpha_{i,1}}\, \frac{\alpha_{i,3}}{\alpha_{i,1}}\, \ldots\, \frac{\alpha_{i,M}}{\alpha_{i,1}}\right]^T = [1\, b_i^T]^T \quad \text{[Equation 17]}$$

If each transmission layer is divided into the same number of partitions, a following linking matrix may also be defined as a following equation 18. In addition, the NPP for each partition in the form of a matrix may be defined as a following equation 19:

$$A=[a_1 \ldots a_{N_s}] \quad \text{[Equation 18]}$$

$$V_m=[v_{1,m} \ldots v_{N,m}], m=1,\ldots,M \quad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an i-th layer, $\hat{a}_i = [\alpha_{i,1}\, \alpha_{i,1}\, \alpha_{i,1}\, \alpha_{i,2}\, \alpha_{i,2}\, \alpha_{i,2}\, \alpha_{i,2}]^T$. An extended linking matrix may be defined by stacking the extended linking vectors as follows: $\hat{A}=[\hat{a}_1 \ldots \hat{a}_{N_s}]$.

In this case, the whole precoding matrix may be expressed as a Hadamard product (or element-wise product) between the extended linking matrix and the NPP matrix $V_t$ as a following equation 20:

$$U = \hat{A} \circ V_t \quad \text{[Equation 20]}$$

where $V_t = [V_1^T \ldots V_M^T]^T$, and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from the above equation, one linking precoder may be configured, which should not be construed as limiting the present invention. For example, a plurality of sub-linking vectors may be configured by additional partitioning of the linking vector $a_l$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the following relationship between the linking vectors is satisfied: $a \Box a_1 = \ldots = a_{N_t}$. In this case, the linking precoder may be expressed only with M or (M−1) linking coefficients.

Meanwhile, the MIMO precoding scheme may be divided into a closed loop precoding scheme and an open loop precoding scheme. Generally, the closed loop precoding scheme considers channels between a transmitter and a receiver in a MIMO precoder configuration. Therefore, additional overhead such as feedback signal transmission and pilot signal transmission by the user equipment is required to estimate the MIMO channel in the transmitter. In this connection, when the channel is correctly estimated, the closed loop precoding scheme is superior to the open loop precoding scheme in terms of the performance Therefore, the closed loop precoding scheme requires estimation accuracy for the channel. Thus, the closed loop precoding scheme is mainly used in a static environment (for example, an environment in which a low Doppler spread and a low delay spread exist) in which a channel change between a transmitter and a receiver is not large. On the other hand, for the open loop precoding scheme, there is no correlation between the channel change between the transmitter and the receiver and the MIMO precoding scheme. Thus, the open loop precoding scheme performs better than the closed loop scheme in environments with large channel variations between the transmitter and receiver.

To apply the closed loop precoding scheme in massive MIMO environments with a large number of antennas, information on each sub-precoder and linking precoder is needed. In this connection, when feedback based on codebook is not applied, the linking precoder information may not be required. Depending on the partitioning scheme, the characteristics of the effective channel experienced by each sub-precoder and the characteristics of the effective channel experienced by the linking precoder may differ from each other.

For example, the MIMO channel experienced by one sub-precoder may have a relatively low Doppler spread characteristic while a channel experienced by another sub-precoder may have high Doppler spread characteristics. In another example, the effective channels experienced by all sub-precoders have similar Doppler characteristics, while the effective channels experienced by the linking precoders may have different Doppler characteristics. Hereinafter, a fractional beamforming scheme that optimizes the MIMO transmission scheme adaptively to the characteristics of each partitioned channel and linking channel in the partitioned precoding environment is illustrated.

<Fractional Beamforming>

The base station may apply the closed loop precoding to one of the precoder for each antenna port partition, and the linking precoder that connects the antenna port partitions. The base station may apply, to the other, one of a precoding scheme (hereinafter referred to as a default precoding) defined by the system, a precoding scheme preset by the network or base station (hereinafter, referred to as a reference precoding), and a precoding scheme (hereinafter referred to as random precoding) randomly determined by the base station.

Hereinafter, a set of partitions and/or linking coefficients to which closed loop precoding is applied is referred to as a controlled space, while a set of partitions and/or linking coefficients to which the closed loop precoding is not applied is called an uncontrolled space.

The default precoding scheme, which is a precoding scheme defined by the system, refers to a method in which the system defines and uses a beam that is transmitted toward the uncontrolled space. The default precoding may be defined to follow any open loop precoding scheme. The default precoding may be set differently depending on the system bandwidth, the number of transmission antennas of the base station, the number of transmission layers (transmission rank) of the base station, the transmission antenna configuration ($N_{t\_v}$, $N_{t\_h}$) of the base station, or the number of transmission antennas in the uncontrolled direction. Alternatively, the beam may be set to a specific beam regardless of the system parameters. Also, the default precoding may be fixed over the entire frequency band and time, or may change on a specific time resource and/or a frequency resource basis.

Further, the reference precoding scheme, which is a base station or a network precoding scheme may mean a method for designating a precoding scheme to be applied to the uncontrolled space to the user equipment by the base station or the network. Thus, reference precoding information for the uncontrolled space may be communicated to the user equipment via the physical layer or higher layer message. The reference precoding information refers to all information that can explicitly and implicitly inform a MIMO precoder to be applied in the uncontrolled space. For example, a specific index (PMI) of the PMI codebook corresponding to the number of transmission antennas for the uncontrolled space, a quantized value of each element of the MIMO precoding matrix of the uncontrolled space, an index to be used after indexing several MIMO precoding schemes, etc. may be signaled as the reference precoding information.

Further, the reference precoding may also be changed on a specific time resource or a frequency resource basis. In this case, after defining a plurality of change patterns based on time/frequency resources for the reference precoding, a reference precoding pattern index used in the corresponding base station or network may be signaled as reference precoding information. Alternatively, a seed value of a random variable generator that may induce a change pattern based on the time/frequency resource may be used as reference precoding information. Alternatively, various precoding schemes (for example, STBC, and delay diversity, etc.) may be used as reference precoding information.

Furthermore, the random precoding scheme, which is a precoding scheme randomly determined by the base station may mean a scheme in which the base station arbitrarily determines and applies a precoding scheme to be applied to the uncontrolled space. Therefore, unlike the default precoding scheme or the reference precoding scheme, the random precoding scheme has a feature that the user equipment does not know a precoder to be applied to the uncontrolled space. For example, the base station may transmit to an uncontrolled space a beam varying randomly on a specific time resource (e.g., an OFDM symbol) and/or frequency resource (e.g., a subcarrier) basis.

Independent partitioning and fractional beamforming schemes may be applied to individual transmission layers in the fractional beamforming scheme. Alternatively, the same partitioning and fractional beamforming schemes may be applied to all transmission layers.

Further, the fractional beamforming scheme may be very useful in a channel environment where a reliability of feedback information on linking coefficients or of feedback information on some of the transmission antennas is poor, or the feedback information is unnecessary. In particular, when the reliability of feedback information on the linking coefficients or of the feedback information on some Tx antennas is poor, the fractional beamforming scheme may prevent unnecessary packet reception error and retransmission due to the feedback information error. Via the fractional beamforming scheme, when the feedback is not necessary, the feedback overhead can be minimized.

<Aligned Partitioned Precoding>

When some or all of the antenna port partitions have the same size and the partitioned antenna array has similar effective channel characteristics, the same precoding method, that is, aligned partitioned precoding, may be applied to the corresponding NPPs.

Figure 16:
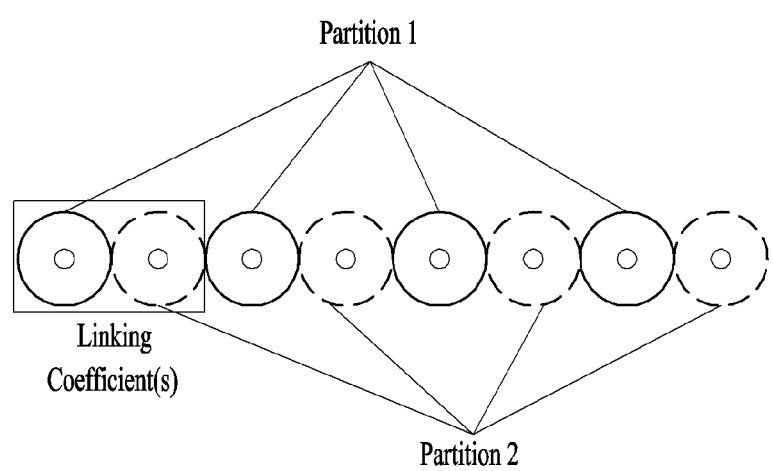
FIG. 16 illustrates an example of applying aligned partitioned precoding in a uniform linear array.

FIG. 16 illustrates an example of applying aligned partitioned precoding in a uniform linear array.

Referring to FIG. 16, in the uniform linear array (ULA) with eight antennas, a first partition is configured to have 1, 3, 5, and 7th antennas. A second partition is configured to have 2, 4, 6, and 8th antennas. When the distance between the antennas is narrow and there are not many scattering objects around the antennas, the first partition and the second partition are likely to suffer similar MIMO channels, except for a phase difference between the two partitions corresponding to a linking precoder component. In this case, the same precoding scheme may be applied to the both partitions.

Figure 17:
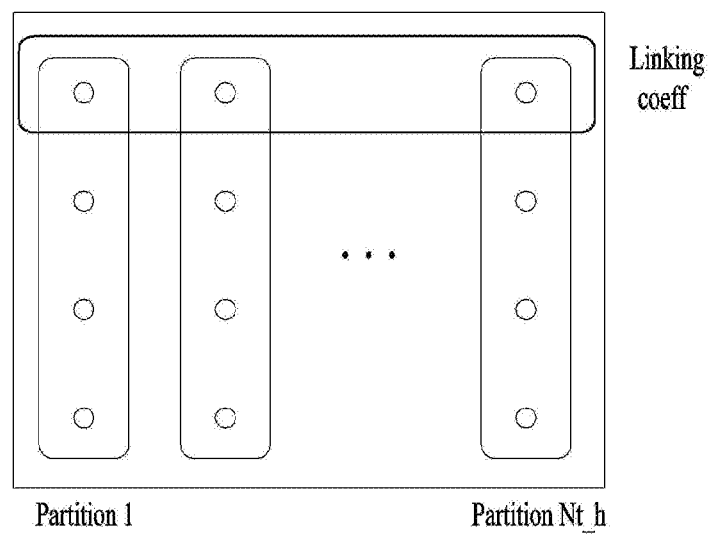
FIG. 17 illustrates an example of applying column-based aligned partitioned precoding in a square array.

FIG. 17 illustrates an example of applying column-based aligned partitioned precoding in a square array.

As shown in FIG. 17, each column is set as a partition in a square array with $N_t$ ($=N_{t\_v} \times N_{t\_h}$) antennas composed of $N_{t\_v}$ rows antennas and $N_{t\_h}$ columns antennas. When the distance between the columns is near and the $N_{t\_h}$ is not large, the same precoding scheme may be applied to all partitions. However, the linking vector linking vector is set independently of the sub-precoder.

Figure 18:
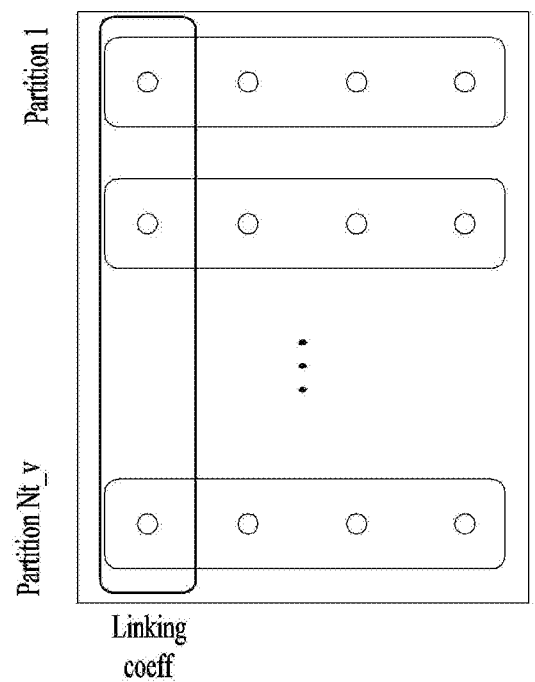
FIG. 18 illustrates an example of applying row-based aligned partitioned precoding in a square array.

FIG. 18 illustrates an example of applying row-based aligned partitioned precoding in a square array.

As shown in FIG. 18, each row is set as a partition in a square array with $N_t$ ($=N_{t\_v} \times N_{t\_h}$) antennas composed of $N_{t\_v}$ rows antennas and $N_{t\_h}$ columns antennas. When the distance between the rows is near and the $N_{t\_v}$ is not large, the same precoding scheme may be applied to all partitions. However, the linking vector linking vector is set independently of the sub-precoder.

Figure 19:
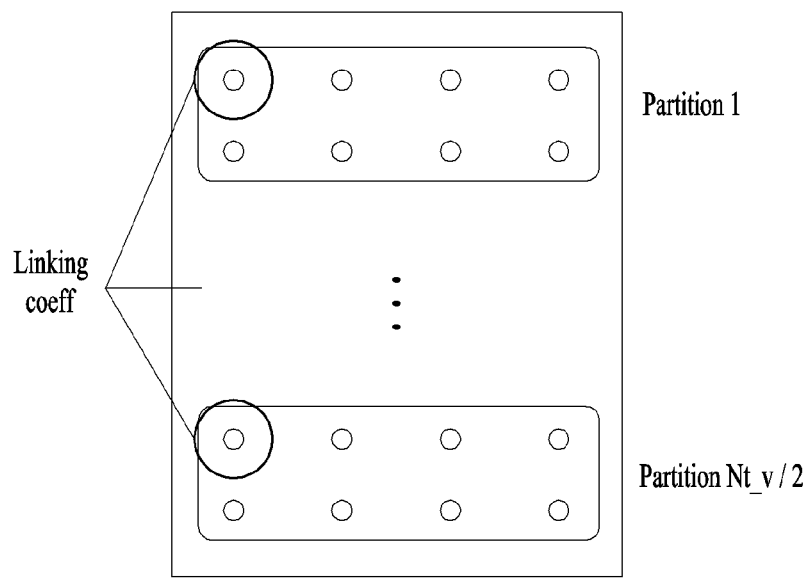
FIG. 19 illustrates an example of applying row group-based aligned partitioned precoding in a square array.

FIG. 19 illustrates an example of applying row group-based aligned partitioned precoding in a square array.

As shown in FIG. 19, each row group is set as a partition in a square array with $N_t$ ($=N_{t\_v} \times N_{t\_h}$) antennas composed of rows antennas and $N_{t\_h}$ columns antennas. When the distance between the row groups is near and the $N_{t\_v}$ is not large, the same precoding scheme may be applied to all partitions. However, the linking vector linking vector is set independently of the sub-precoder.

As in the examples of FIG. 16 to FIG. 19, when all the partitions have the same size and when the same precoder is applied to all partitions, the precoder for the i-th layer may be expressed as a Kronecker product between a linking precoder and a sub-precoder as in a following equation 21:

$$u_i = [\alpha_{i,1} v_{i,1}^T \alpha_{i,2} v_{i,2}^T \ldots \alpha_{i,M} v_{i,M}^T]^T = [\alpha_{i,1} v_i^T \alpha_{i,2} v_i^T \ldots \alpha_{i,M} v_i^T]^T = a_i \otimes v_i$$ [Equation 21]

Further, when the same partitioning is performed for all transmission layers, the MIMO precoder for all the layers may be expressed as a Khatri-Rao product (column-wise Kronecker product) between a linking matrix A of a size $M \times N_s$ and a sub-precoding matric $V = [v_1 \ldots v_{N_s}]$ of a size $$\frac{N_t}{M} \times N_s,$$

matrix as in Equation 22 below:

$$U = [a_1 \otimes v_1 \ldots a_{N_s} \otimes v_{N_s}] = A * V$$ [Equation 22]

Further, as shown in FIG. 17, when each column is configured as a partition in a two-dimensional antenna port array environment, the sub-precoder $v_i$ or V performs the vertical beamforming V (or elevation beamforming), while the linking precoder $a_i$ or A performs the horizontal beamforming (or azimuth beamforming). Similarly, when each row is configured as a partition in a two-dimensional antenna port array environment as shown in FIG. 18, the sub-precoder $v_i$ or V performs the horizontal beamforming (or azimuth beamforming) while the linking precoder $a_i$ or A performs the vertical beamforming V (or elevation beamforming).

Consequently, as in the example of FIG. 17 or of FIG. 18, when the partitioned precoding perfectly aligned in a row or column direction in a two-dimensional antenna port array environment is performed, the precoder that performs three-dimensional beamforming may be represented by a combination of one sub-precoder and one linking precoder, where one thereof performs the vertical beamforming and the other thereof performs the horizontal beamforming.

When the fractional beamforming is applied in an environment where the perfectly aligned partitioned precoding is performed, the base station applies the closed loop precoding to one of the sub-precoder and the linking precoder and applies one of a default precoding, a reference precoding, and a random precoding to the other in a situation where the precoding for all partitions is the same.

It may be useful to perform 3D beamforming in an environment configured with the two-dimensional antenna array as shown in FIG. 17 and FIG. 18. The 3D beamforming, especially, user equipment-specific (UE-specific) 3D beamforming has the advantage of optimizing transmission performance due to the horizontal and vertical locations of the user equipment and the fading environment in the three-dimensional space. However, the user equipment-specific 3D beamforming may employ the closed loop precoding scheme. Thus, in order to perform the closed loop precoding scheme, the equipment-specific 3D beamforming requires exact channel information (CSI) between the base station and user equipment.

Thus, increasing in the number of base station antennas and increasing in beamforming dimensions may cause the difference between the performance minimum value and the performance maximum value according to the MIMO transmission scheme to becomes worse. Thus, the performance sensitivity to the base station CSI estimation error factors such as channel estimation error, feedback error, and channel aging may be higher. When the CSI estimation error of the base station is not severe, a normal transmission may occur due to the effects of channel coding. When the estimation error is severe, a packet reception error occurs such that severe degradation such as packet retransmission may occur.

For example, performing the 3D beamforming on the base station and user equipment traveling fast in the horizontal direction may cause a high probability of packet retransmission. Conventionally, the open loop precoding scheme was used to such user equipment. However, since this user equipment experiences a static channel in the vertical direction, it is advantageous to perform the vertical beamforming for the UE. Conversely, for the user equipment that is moving rapidly in the vertical direction or for the user equipment in a highly scattered environment in the vertical direction, it is advantageous to perform the horizontal beamforming for the UE. Further, the 3D beamforming may be performed on the user equipment located in a tall and narrow building, and the base station may fix the horizontal beamforming direction to a specific direction. In other words, it is also possible to reduce the feedback overhead by inducing the user equipment to configure the feedback information only for the vertical beamforming.

Therefore, when the fractional beamforming is applied to the 3D beamforming environment, the 2D beamforming (vertical beamforming or horizontal beamforming) may be performed in an adaptive manner to the user's environment. In this respect, the above scheme may be referred to as partial dimensional beamforming. For example, the base station with a two-dimensional transmission antenna port may apply the closed loop precoding to one of a vertical precoder or a horizontal precoder, and may apply, to the other, one precoding scheme among the default precoding, the reference precoding, and the random precoding.

As described above, each sub-precoder and linking precoder in the partitioned precoding scheme has been defined in terms of data transmission from the base station. From the viewpoint of the user equipment, information PPI (preferred precoding index) related to the preferred precoder in relation with the sub-precoder and linking precoder to which the closed loop scheme is applied may be transmitted from the UE to the base station. A representative PPI may be a PMI feedback scheme that indexes matrix precoders and then feeds back a preferred index.

When some feedback information is separated based on a unit that is configured as a partition, and/or a value that connects partitions, it is also possible to associate the pilot signals transmitted by the base station to the user equipment with a specific set of antenna ports. This set of pilot signals may be called a pilot pattern. A representative pilot pattern may be a NZP (non-zero-power) CSI-RS resource (or process) that is a measurement pilot used in the LTE system. For example, the present disclosure might define a following mapping relationship between the partition, CSI-RS, and PMI feedback.

A. Aligned Unit of Partition & Pilot Pattern & PMI Feedback 1. (Partition) In a system configured with 16 antenna ports, the base station configures two partitions, each having 8 antenna ports and performs partitioned precoding.

2. (Pilot pattern) To support the partitioned precoding, the base station allocates and transmits 8tx NZP CSI-RS resources per each partition, that is, configures, for the UE, two co-located NZP CSI-RS resources.

3. (PMI feedback) The user equipment feeds back PMI1 and PMI2 for the two antenna port partitions and the linking coefficient values (e.g., PMI3 for the linking precoder) that connect the PMI1 and PMI2.

That is, when allocating a separate NZP CSI-RS resource to each antenna port partition, the base station may configure multiple NZP CSI-RS resources for the user equipment, for multiple co-located (or synchronized) antenna port partitions belong to a single base station (or transmission point). In this regard, in order for the UE to distinguish the non-co-located antenna port pattern used for the CoMP transmission from the above co-located antenna port pattern, the base station may further inform to the UE whether the NZP CSI-RS resources are co-located. For example, the QCL (quasi-co-location) conditions between multiple NZP CSI-RS resources may be informed to the user equipment.

The pilot transmission unit and the antenna port partition unit do not have to match with each other as in the above example. For example, while one 8tx CSI-RS resource is configured by the UE, the user equipment may configure the feedback information on the two 4tx partitions. Also, the antenna port partition unit and the feedback unit do not have to match with each other. In particular, in the case of the aligned partitioned precoding, common PPI feedback information may be feedback for partitions that the same precoding is applied. Thus, a single feedback unit may be configured for multiple partitions.

B. Not Aligned Unit of Partition & Pilot Pattern & PMI Feedback 1. (Partition) It is assumed that the antenna port partitioning is configured in the same way as in FIG. 18 above.

2. (PMI feedback) Feedback information is configured with PPI (hereinafter referred to as common PPI) that may be applied to all partitions and linking coefficient values, in consideration of the perfectly aligned partitioned precoding. In this case, the partition unit and the feedback unit may be considered to be different from each other.

Figure 20:
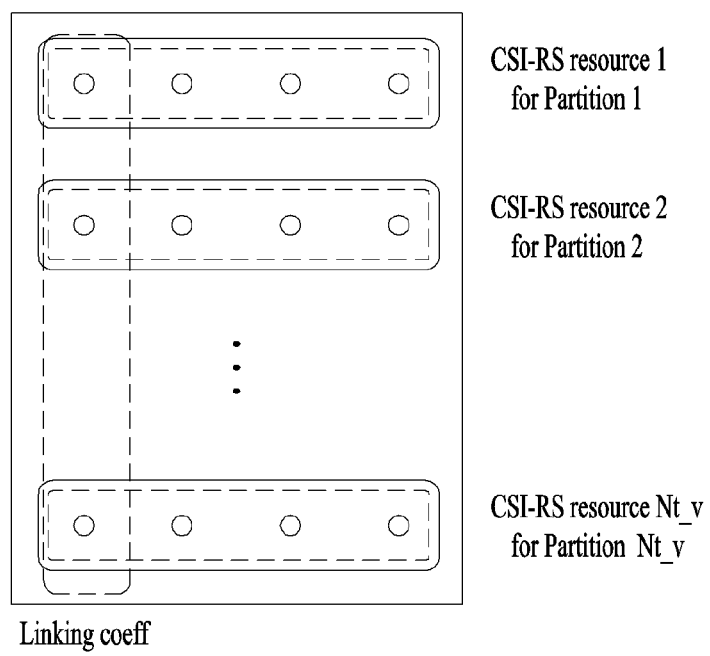
FIG. 20 to FIG. 22 illustrate pilot pattern allocation methods.
Figure 21:
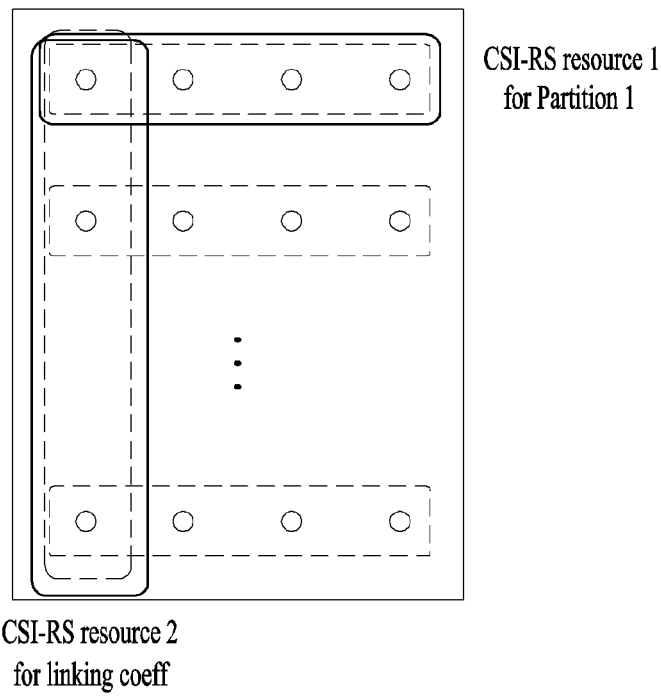
Figure 22:
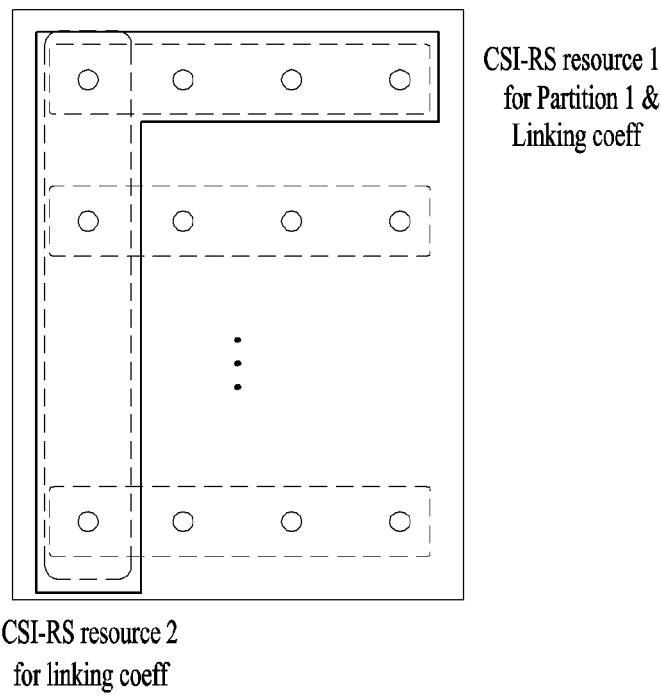

3. (Pilot pattern) The pilot pattern allocation method may vary. FIGS. 20 to 22 illustrate pilot pattern allocation methods.

Specifically, the method may configure a separate pilot resource for each partition as shown in FIG. 20. As shown in FIG. 21, the method may transmit one pilot pattern to the first partition such that the user equipment can calculate the common PPI. Further, one pilot pattern may be transmitted to the antenna ports to which the linking precoder is applied so that the user equipment can calculate the linking coefficient values. Alternatively, the method may set only one pilot pattern, as shown in FIG. 22 so that the user equipment can calculate the common PPI and linking factors at once.

A basic idea of the present disclosure is as follows: in the 3D beamforming scheme described above, the user equipment divides the precoder configuration of the base station into a part to perform the closed loop MIMO operation and a part to perform the open loop MIMO operation, and then performs CSI calculation and reporting based on the division, and the base station instructs those operations. In a representative example, in the 3D beamforming, one of vertical beamforming and horizontal beamforming may perform a closed loop operation while the other may perform an open loop operation. However, since the CSI-RS port mapping based on the antenna array partitioning is assumed, the present disclosure suggests an overall CSI processing scheme when the CSI-RS port is beamformed by the entire antenna array.

Figure 23:
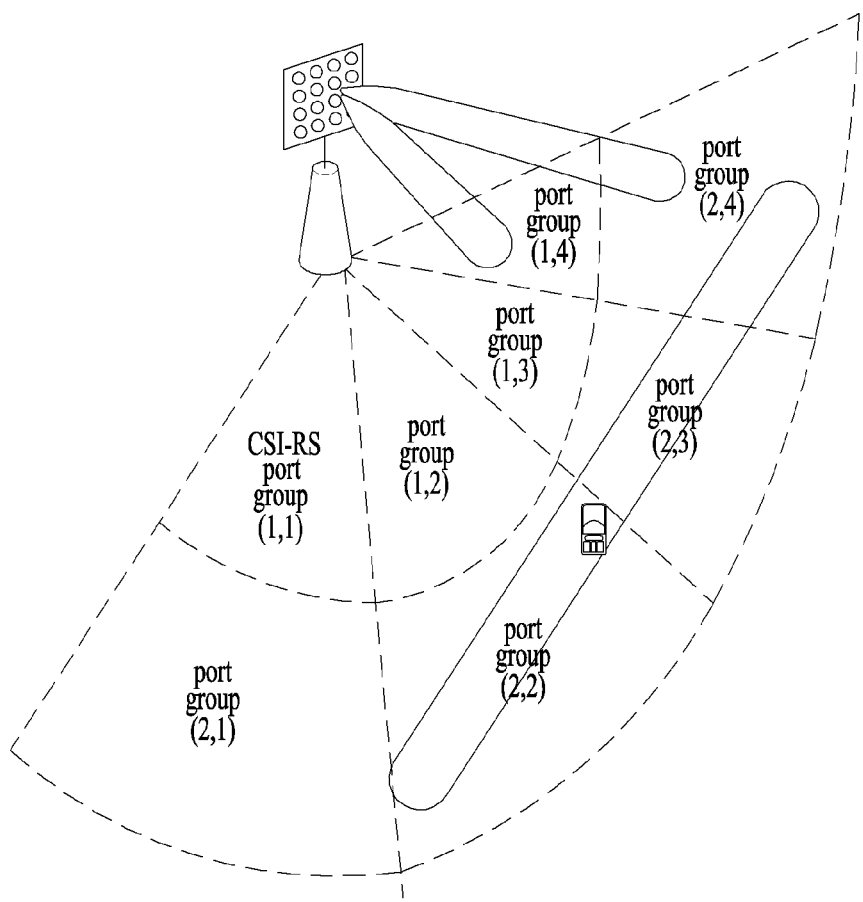
FIG. 23 shows an example in which CSI-RS ports are divided into port groups according to an embodiment of the present disclosure.

FIG. 23 shows an example where the CSI-RS ports are divided into port groups according to an embodiment of the present disclosure.

Referring to FIG. 23, there are a total of 8 CSI-RS port groups. It is assumed that different vertical beamforming and horizontal beamforming are applied to different port groups. In particular, the vertical direction beam i and the horizontal direction beam j are applied to the CSI-RS ports belonging to the CSI-RS port group (i, j) to transmit the signal to the corresponding region.

When each CSI-RS resource is individually mapped to each CSI-RS port group in FIG. 23, technical proposal and standardization of Beamformed CSI-RS in 3GPP LTE Rel-13 FD-MIMO has already been progressed. In the standard document, for the user equipment, a plurality of CSI-RS resources are configured via a RRC layer message, and then, the UE included and reports the preferred CRI (CSI-RS resource indicator) in the CSI feedback information. The present disclosure proposes a method for reporting the CSI to apply the 3D beamforming based on such beamformed CSI-RS. Hereinafter, for convenience of illustration, a plurality of CSI-RS ports to which the same beamforming is applied are referred to as a CSI-RS PG.

First Embodiment

In the first embodiment of the present disclosure, the base station or network configures a plurality of CSI-RS PGs and transmits the same to the user equipment. In addition, the base station or network informs the UE of CSI-RS PG set information.

In the closed loop scheme, the user equipment selects the preferred CSI-RS PG set(s) from different CSI-RS PG sets, and, then, includes the CGSI (CSI-RS PG Set Indicator) indicating the selected CSI-RS PG set into the feedback information. Further, the user equipment assumes that one of the precoding schemes including the precoding scheme (default precoding) defined by the system, the precoding scheme (reference precoding) pre-specified by the base station or network, and the random precoding scheme (random precoding) is applied to between the plurality of CSI-RS PGs included in the selected CSI-RS PG set. Then, under the assumption, the UE calculates the CSI (for example, CQI) and includes the same into the feedback information. That is, the open loop scheme is applied.

The following two schemes may be considered as a scheme for applying the open loop MIMO to between the plurality of CSI-RS PGs.

1) A first scheme may configure M port CSI-RS by aggregating all CSI-RS ports belonging to the selected CSI-RS PG and may apply the open loop MIMO to the M-port CSI-RS.

2) A second scheme applies the closed loop MIMO to the CSI-RS ports belonging to each selected CSI-RS PG, and applies the open loop MIMO to between the CSI-RS PGs. For example, when the UE selects a CSI-RS PG set with CSI-RS PG #1 and CSI-RS PG #2, and when PMI1 of rank 1 and PMI2 of rank 1 are selected by the UE for CSI-RS PG #1 and CSI-RS PG #2, respectively, the open loop MIMO is applied to the concatenated channel [$H_{CSIRS1}$*PMI1 $H_{CSIRS2}$*PMI2] to calculate the CQI.

Figure 24:
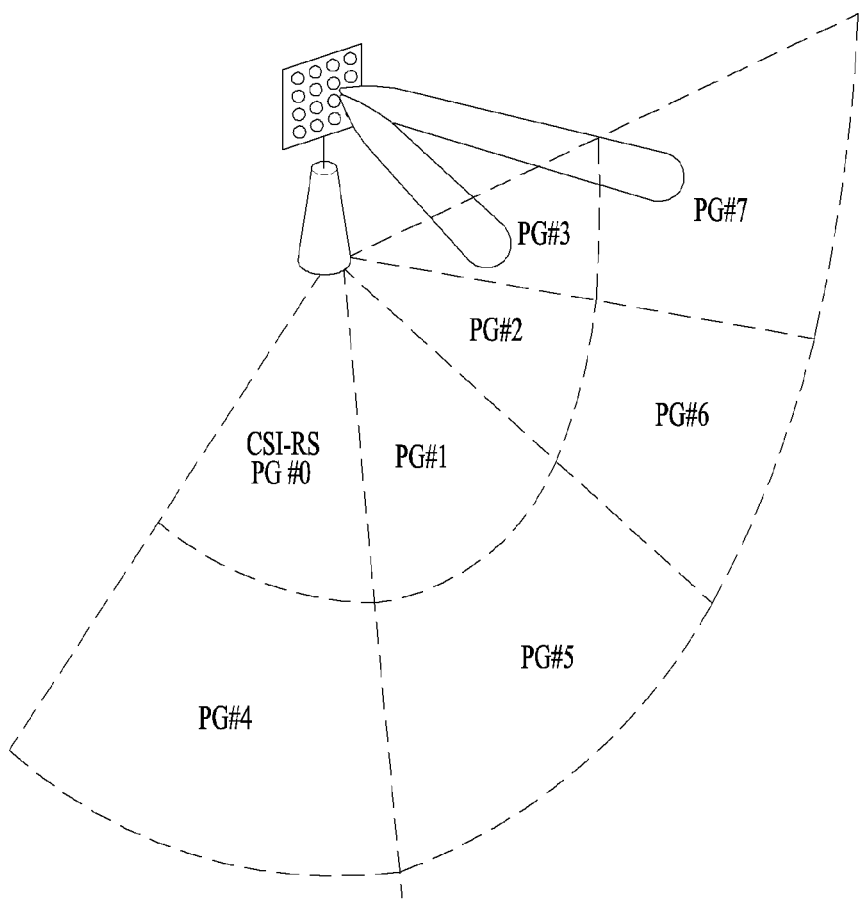
FIG. 24 shows another example where CSI-RS ports are divided into port groups according to an embodiment of the present disclosure.

FIG. 24 shows another example where CSI-RS ports are divided into port groups according to an embodiment of the present disclosure. In FIG. 24, it is assumed that the base station has eight beamformed CSI-RS PGs. In particular, it is assumed that the antenna element of the base station is a cross polarization antenna and one port is transmitted per each polarization. That is, there are two CSI-RS ports in one CSI-RS PG.

In such a case, when the user equipment has little movement in the vertical direction relative to the base station and when the UE has a greater amount of motion in the horizontal direction, or when the shadowing variation is large, the base station may also create a CSI-RS resource set by bundling the horizontal beams. This may be described using examples.

Example A

The base station configures set #0: {#0, #1, #2, #3} and set #1: {#4, #5, #6, #7} as CSI-RS PG set information. The base station also provides that information to the user equipment. This is an example in which the closed loop is applied only to the vertical beamforming. That is, the base station performs the vertical beamforming of the user equipment in the closed loop manner via the CGSI information, while performing the horizontal beamforming thereof in the open loop scheme.

Example B

When it is determined that the user equipment moves too much relative to the base station within a specific 3D beam group or that the shadowing deviation is large, the base station may also create a CSI-RS resource set by bundling arbitrary 3D beams. For example, the base station may configure, as the CSI-RS PG set information, set #0: {#0, #1, #4, #5} and set #1: {#2, #3, #6, #7}. Then, the base station may also provide that information to the user equipment. This is an example showing that the present technique may be applied to any beam group.

The user equipment assumes that a predefined open loop precoding (e.g., SFBC (space-frequency block coding), LD-CDD (large delay CDD)) is applied to between the four CSI-RS PGs belonging to each set and between the eight CSI-RS ports. Under this assumption, the UE compares the CSI-RS PG set #0 with the CSI-RS PG set #1 and selects the preferred CSI-RS PG set index. Also, when the selected CSI-RS PG set is used, a CQI value is calculated by the UE when the pre-defined open loop precoding (for example, SFBC and LD-CDD) is applied to between the ports in the set. The CSI feedback information may include CSI-RS PG set indicator (CGSI) and CQI.

In the application of the present disclosure, configuration information about a plurality of CSI-RS PGs and CSI-RS PG set information may be transmitted in the same or different messages. The transmission layers may also be different therebetween. For example, the CSI-RS PG configuration information is transmitted to the RRC layer. When the CSI-RS PG set information needs to be changed more quickly due to the user equipment movement or environmental information, the CSI-RS PG set information may be transmitted via a lower layer message (e.g., the MAC layer and physical layer message).

Further, the CSI-RS PG set information is configured such that via a higher layer message, the candidate group sets for the CSI-RS PG are configured. Which set among the candidate group sets for the CSI-RS PG is to be used may be dynamically configured via a lower layer message. For example, when the set configuration scheme of the above Example A) and the set configuration scheme of the above Example B) are dynamically changed by the same base station, the two set configuration schemes may be configured for the UE via a higher layer message (e.g., RRC layer message). Then, the base station dynamically specify which of the two set configuration schemes to use via a 1-bit lower layer message.

In one example, one or more CSI-RS PGs may be included in one CSI-RS resource defined in the LTE standard. In such a case, the meaning of the CSI-RS PG set information may be defined as in following manners a) to c).

a) When a plurality of CSI-RS PGs are included in one CSI-RS resource, the plurality of CSI-RS ports in one CSI-RS resource may have different beamforming applied thereto. In this case, the CSI-RS PG set information means port set information in one CSI-RS resource, and the CGSI information indicates an indicator of a preferred port set in one CSI-RS resource.

b) When a CSI-RS resource and a CSI-RS PG are mapped in an one-to-one manner, the CSI-RS PG set information may mean resource set information, and the CGSI information may also mean information about a preferred resource set.

c) Conversely, when the ports included in multiple CSI-RS resources have the same beamforming applied thereto, the plurality of CSI-RS resources may be mapped to one CSI-RS PG. In this case, the PG set information means set information about the resource group, and the CGSI information corresponds to the indicator information about the set of resource groups.

In the case of a) or c) above, the CSI-RS PG configuration information and the CSI-RS resource configuration information may be signaled separately.

When only one or two CSI-RS ports are included in the CSI-RS PG, the operation of the user equipment for selecting the CSI-RS PG may correspond to the operation of selecting a rank 1 precoder and a rank 2 precoder by the UE. Assuming the closed loop operation, and when the user equipment selects N ports or [N/2] CSI-RS PGs and reports the same to the base station, the base station selects some M ports from the N candidate CSI-RS ports and performs rank M transmission to the UE. In this environment, applying the present technique may allow the user equipment to select the CSI-RS PG set rather than the CSI-RS PG, and to assume that the open loop MIMO precoding is applied to the PG set. That is, when the user equipment selects N ports or [N/2] PGs and reports them to the base station, the base station may perform rank ½ open loop precoding using all of the [N/2] beams.

Since the CGSI is used for precoder selection, it is desirable to report the CSI at a period corresponding to the PMI when the CGSI is included in the periodic CSI report. Therefore, it is preferable to feedback the CGSI at a shorter period than that of CRI or RI.

When the number of ports contained in the CSI-RS PG or the number of CSI-RS PGs is large, the operation of selecting the CGSI may correspond to the operation of selecting a relatively wide beam coverage. Additional CSI-RS transmission/configuration and reporting procedures may occur subsequently for finer beamforming (or precoding) within the beam coverage. For example, performing the above-described operations may allow the beamforming direction and the MCS (modulation and coding scheme) level information to be applied to the physical channel/signal (for example, PDCCH) that the base station must transmit stably in a relatively wide beam coverage to be obtained. Thereafter, in order to obtain the beamforming direction and MCS (modulation and coding scheme) level information to be applied to the physical channel/signal (for example, PDSCH) that the base station must transmit in a relatively narrow beam coverage but at a lower stability, an additional CSI-RS configuration and reporting procedure (that is, a CSI process) may be performed. That is, the proposed technique may also be used for control channel transmission.

In addition, a case where the size of the CSI-RS PG set is 1 may be considered. In this case, the CSI-RS PG set information is omitted and the user equipment calculates the CQI under assumption that the open loop precoding is applied to the CSI-RS ports belonging to the CSI-RS PG. Therefore, the CGSI value corresponds to the preferred PG index.

Second Embodiment

The second embodiment follows the principle of the first embodiment. In the second embodiment, the base station does not indicate the set information about the CSI-RS PG. The user equipment reports the information assuming that the open loop precoding is applied to the specific PG set.

First, the network configures and provides N CSI-RS PGs to the user equipment. The user equipment selects the M (<N) PGs preferred among the N CSI-RS PGs (the closed loop scheme). The UE then includes an indicator about the selected CSI-RS PGs in the feedback information. Further, the user equipment assumes that one precoding scheme (the open loop scheme) among a precoding scheme (default precoding) defined by the system, a precoding scheme (reference precoding) predefined by the base station or the network, and an arbitrary precoding scheme (random precoding) is applied to between the selected M CSI-RS PGs. Under this assumption, the UE calculates the CSI (for example, CQI) and includes the same in feedback information.

For efficient support of the second embodiment, in a first approach, the network selects and provides a plurality of PGs in advance to the user equipment and the user equipment assumes that the open loop scheme is applied to between the provided PGs. Alternatively, a second scheme may be considered to feedback whether the open loop scheme is applied to the PGs when the user equipment feedbacks M CSI-RS PG indicator information. Alternatively, in a third approach, when the user equipment selects and reports multiple PGs, the UE may report both of the CSI value obtained in case of assuming that the closed loop is applied to between PGs and the CSI value obtained in case of assuming that the open loop is applied to between PGs. This operation may be realized either by the instruction from the base station or by the determination by the user equipment. When the UE calculates and reports the CSI value for each of the two cases, the both CSI values may have a difference value (e.g., differential CQI) from each other.

When the network provides the beamforming information applied to each PG, the present disclosure may also consider an approach that more efficiently performs feedback from the user equipment. For example, when the proximity of the beam is indicated according to the PG index, and when the user equipment selects/applies more than two PGs, the user equipment can feedback the selected plurality of PGs efficiently by feeding only the lowest PG index and the highest PG index since the PG indexes to which the open loop MIMO is applied will be continuous. When different 3D beamforming are applied to between the PGs such that the PG index (i, j) configured with the vertical beam index i and the horizontal beam index j is considered, the user equipment feeds back four indices such as the lowest vertical beam index, the highest vertical beam index, the lowest horizontal beam index, and the highest horizontal beam index. As a result, the UE can efficiently feedback the PG list.

In another approach, after the base station has configured M transmission modes, feeding back the selected/applied transmission mode from the user equipment may allow the amount of feedback information about the PG indexes to be reduced. For example, it is assumed that following four transmission modes supported by the network are configured.

Transmission mode 1: vertical direction alone beamforming (closed loop operation for vertical direction, open loop operation for horizontal direction)

Transmission mode 2: horizontal direction alone beamforming (open loop operation for vertical direction, closed loop operation for horizontal direction)

Transmission mode 3: 3D beamforming (closed loop operation for vertical direction, closed loop operation for horizontal direction)

Transmission mode 4: open loop MIMO (open loop operation for vertical direction, open loop operation for horizontal direction).

When the user equipment feeds back the CSI for the N (N=1 to 4, N is configured by the network or the user equipment determines N) transmission modes as described above, this may reduce PG list information due to transmission mode information. For example, when the UE is configuring CSI feedback information for the transmission mode 1, the user equipment and the base station know information about the transmission mode 1 since the user equipment has reported the transmission mode or the base station has specified the same. Therefore, even when the user equipment selects and reports only a single PG index corresponding to the vertical direction domain, that is, a single vertical direction beam index i, the base station may know that the corresponding information is information corresponding to a case when the UE applies from PG index (i, 1) to PG index (i, j_max) when all possible horizontal direction beams are applied to all corresponding vertical direction beams.

It may be obvious that the CQI referred to herein may be interpreted as a CQI for each codeword when a plurality of codewords are simultaneously transmitted using one precoder in a transmission of rank 2 or greater.

Figure 25:
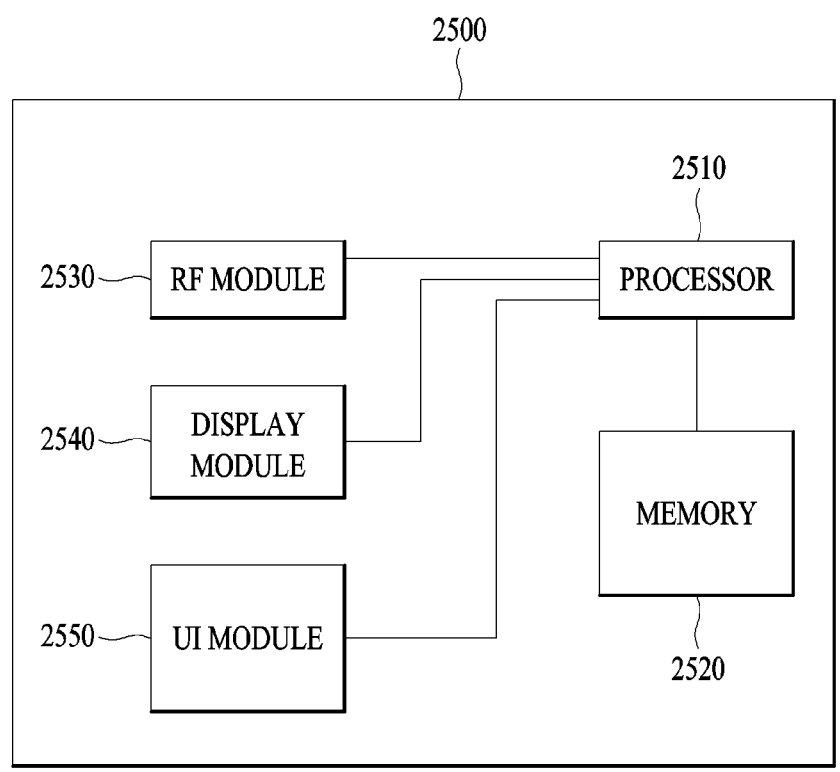
FIG. 25 is a block diagram of a communication apparatus according to an embodiment of the present disclosure.

FIG. 25 is a block diagram of a communication apparatus according to an embodiment of the present disclosure.

Referring to FIG. 25, a communication device 2500 includes a processor 2510, a memory 2520, a radio frequency (RF) module 2530, a display module 2540, and a user interface (UI) module 2550.

The communication device 2500 is illustrated for convenience of description and some modules may be omitted. The communication device 2500 may further include necessary modules. Some modules of the communication device 2500 may be further divided into sub-modules. The processor 2500 is configured to perform operations according to the embodiments of the present disclosure exemplarily described with reference to the drawings. Specifically, for a detailed description of operations of the processor 2500, reference may be made to the description described with reference to FIGS. 1 to 24.

The memory 2520 is connected to the processor 2510 and stores operating systems, applications, program code, data, and the like. The RF module 2530 is connected to the processor 2510 and performs a function of converting a baseband signal into a radio signal or converting a radio signal into a baseband signal. For this, the RF module 2530 performs analog conversion, amplification, filtering, and frequency upconversion or performs inverse processes thereof. The display module 2540 is connected to the processor 2510 and displays various types of information. The display module 2540 may include, but is not limited to, a well-known element such as a liquid crystal display (LCD), a light emitting diode (LED), or an organic light emitting diode (OLED). The UI module 2550 is connected to the processor 2510 and may include a combination of well-known UIs such as a keypad and a touchscreen.

The above-described embodiments are combinations of elements and features of the present disclosure in a predetermined manner. Each of the elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present disclosure can be implemented by various means, for example, hardware, firmware, software, or combinations thereof. In the case of a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present disclosure may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The descriptions of the presented embodiments are provided so that one of ordinary skill in the art of the present disclosure may use or implement the present disclosure. Various modifications to these embodiments will be readily apparent to those skilled in the art of the present disclosure. The generic principles defined herein may be applied to other embodiments without departing from the scope of the present disclosure. Thus, the present disclosure is not to be limited to the embodiments set forth herein but is to be accorded the widest scope consistent with the principles and novel features presented herein.

INDUSTRIAL APPLICABILITY

A method for transmitting feedback information for three-dimensional MIMO based on a beamformed reference signal in a wireless communication system as described above, and a device for performing the method was set forth by way of examples as applied to the 3GPP LTE system. However, the method and device may be applied to various wireless communication systems other than the 3GPP LTE system.

The invention claimed is:

1. A method for transmitting, by a user equipment, feedback information to a base station in a wireless communication system, the method comprising:

receiving, from the base station, information about a plurality of reference signal port group sets, wherein each of the plurality of reference signal port group sets comprises one or more reference signal port groups, and wherein each of the one or more reference signal port groups comprises a first reference signal port beamformed vertically and a second reference signal port beamformed horizontally;

selecting one reference signal port group set among the plurality of reference signal port group sets;

based on a specific precoder being applied to the selected reference signal port group set, calculating channel state information (CSI) corresponding to the reference signal port group set; and transmitting, to the base station, the feedback information including an indicator indicating the selected reference signal port group set and the channel state information;

wherein the one or more reference signal port groups belonging to the same reference signal port group set have the same first reference signal port beamformed vertically, and wherein the specific precoder is defined by concatenating precoders applied to second reference signal ports beamformed horizontally included in the one or more reference signal port groups belonging to the selected reference signal port group set.

2. The method of claim 1, wherein the method further comprises:

receiving information on the reference signal port groups via a higher layer signal, wherein the information about the reference signal port group sets is received via a physical layer signal.

3. The method of claim 1, wherein the method further comprises:

receiving a downlink control signal transmitted based on the feedback information from the base station.

4. The method of claim 1, wherein the method further comprises:

receiving, from the base station, information regarding a reference signal port group set for downlink signal transmission determined based on the feedback information.

5. An user equipment (UE) in a wireless communication system, the UE comprising:

a transmitter and receiver; and a processor operatively coupled to the transmitter and receiver, wherein the processor is configured for:

receiving, from the base station via the receiver, information about a plurality of reference signal port group sets, wherein each of the plurality of reference signal port group sets comprises one or more reference signal port groups, and wherein each of the one or more reference signal port groups comprises a first reference signal port beamformed vertically and a second reference signal port beamformed horizontally;

selecting one reference signal port group set among the plurality of reference signal port group sets;

based on a specific precoder being applied to the selected reference signal port group set, calculating channel state information (CSI) corresponding to the selected reference signal port group set; and transmitting, to the base station via the transmitter, the feedback information including an indicator indicating the selected reference signal port group set and the channel state information;

wherein the one or more reference signal port groups belonging to the same reference signal port group set have the same first reference signal port beamformed vertically, and wherein the specific precoder is defined by concatenating precoders applied to second reference signal ports beamformed horizontally included in the one or more reference signal port groups belonging to the selected reference signal port group set.

6. The UE of claim 5, wherein the processor is further configured for receiving information on the reference signal port groups via a higher layer signal, and wherein the information about the reference signal port group sets is received via a physical layer signal.

7. The UE of claim 5, wherein the processor is further configured for receiving, via the receiver, a downlink control signal transmitted based on the feedback information from the base station.

8. The UE of claim 5, wherein the processor is further configured for receiving, from the base station via the receiver, information regarding a reference signal port group set for downlink signal transmission determined based on the feedback information.

* * * * *